United States Patent
Tlaskal et al.

(10) Patent No.: US 6,795,589 B1
(45) Date of Patent: Sep. 21, 2004

(54) OPTIMIZING IMAGE COMPOSITING

(75) Inventors: Martin Paul Tlaskal, Elizabeth Bay (AU); Timothy Merrick Long, Lindfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/387,564

(22) Filed: Sep. 1, 1999

(30) Foreign Application Priority Data

Sep. 3, 1998 (AU) ............................................. PP5687
Sep. 3, 1998 (AU) ............................................. PP5688

(51) Int. Cl.$^7$ ............................ G06K 9/36; G09G 5/00
(52) U.S. Cl. ...................... 382/284; 382/173; 382/240; 345/629
(58) Field of Search ................................ 382/284, 162, 382/171, 173, 212, 213, 222, 227, 256, 266, 274, 286, 282, 305; 345/421, 592, 619, 629, 630, 422, 440

(56) References Cited

U.S. PATENT DOCUMENTS

| | | | |
|---|---|---|---|
| 5,307,452 A | | 4/1994 | Hahn et al. .................. 395/132 |
| 5,557,711 A | * | 9/1996 | Malzbender ................. 345/422 |
| 5,745,121 A | * | 4/1998 | Politis ......................... 345/629 |
| 5,966,139 A | * | 10/1999 | Anupam et al. ............. 345/440 |
| 6,191,797 B1 | * | 2/2001 | Politis ......................... 345/440 |
| 6,215,503 B1 | * | 4/2001 | Snyder et al. ............... 345/629 |

FOREIGN PATENT DOCUMENTS

| | | | |
|---|---|---|---|
| AU | 23359/95 | 2/1996 | ......... G06T/011/00 |
| AU | 23362/95 | 2/1996 | ......... G06T/015/30 |
| AU | 26911/99 | 12/1999 | ......... G06T/001/00 |
| EP | 0 647 921 A2 | 4/1995 | ........... G06T/11/00 |
| EP | 0 694 881 A2 | 1/1996 | ........... G06T/11/60 |
| EP | 0 809 213 A2 | 11/1997 | ........... G06T/11/60 |
| EP | 0 854 440 A | 7/1998 | ............. G06T/7/40 |

OTHER PUBLICATIONS

M. Shantzis, "A Model For Efficent And Flexible Image Computing," Computer Graphics Proceedings Annual Conference Seriers, Siggraph (1998), pp. 147–154.

* cited by examiner

*Primary Examiner*—Kanji Patel
(74) *Attorney, Agent, or Firm*—Fitzpatrick, Cella, Harper & Scinto

(57) ABSTRACT

A method and apparatus for creating an image is disclosed. The image is formed by rendering at least a plurality of graphical objects to be composited according to a compositing expression. Each object has a predetermined outline. The method comprises the following steps. Firstly, dividing a space in which the outlines are defined into a plurality of mutually exclusive regions wherein each of the regions is defined by a region outline substantially following at least one of the predetermined outlines or parts thereof. Secondly, examining each of the regions to determine those objects which contribute to the regions. Thirdly, modifying the compositing expression on the basis of the contribution of each of the objects within the region to form an optimized compositing expression for each region. Fourthly, compositing the image using each of the optimized compositing expressions.

85 Claims, 16 Drawing Sheets

OPTIMIZING IMAGE COMPOSITING

The file of this patent application includes a computer program listing appendix stored on two identical read-only Compact Discs. Each Compact Disc has the computer program listing appendix stored as a file named "appendix1.doc" that was created on Jul. 23, 2003 and is 249,856 bytes in size. This computer program listing appendix is hereby incorporated herein by reference.

FIELD OF THE INVENTION

The present invention relates to the creation of computer-generated images both in the form of still pictures and video imagery, and, in particular, relates to efficient process, apparatus, and system for creating an image made up by compositing multiple components.

BACKGROUND

Computer generated images are typically made up of many differing components or graphical elements which are rendered and composited together to create a final image. In recent times, an "opacity channel" (also known as a "matte", an "alpha channel", or simply "opacity") has been commonly used. The opacity channel contains information regarding the transparent nature of each element. The opacity channel is stored alongside each instance of a colour, so that, for example, a pixel-based image with opacity stores an opacity value as part of the representation of each pixel. An element without explicit opacity channel information is typically understood to be fully opaque within some defined bounds of the element, and assumed to be completely transparent outside those bounds.

An expression tree offers a systematic means for representating an image in terms of its constituent elements and which facilitates later rendering. Expression trees typically comprise a plurality of nodes including leaf nodes, unary nodes and binary nodes. Nodes of higher degree, or of alternative definition may also be used. A leaf node, being the outer most node of an expression tree, has no descendent nodes and represents a primitive constituent of an image. Unary nodes represent an operation which modifies the pixel data coming out of the part of the tree below the unary operator. Unary nodes include such operations as colour conversions, convolutions (blurring etc) and operations such as red-eye removal. A binary node typically branches to left and right subtrees, wherein each subtree is itself an expression tree comprising at least one leaf node. Binary nodes represent an operation which combines the pixel data of its two children to form a single result. For example, a binary node may be one of the standard "compositing operators" such as OVER, IN, OUT, ATOP and alpha-XOR, examples of which and other are seen in FIG. 20.

Several of the above types of nodes may be combined to form a compositing tree. An example of this is shown in FIG. 1. The result of the left-hand side of the compositing tree may be interpreted as a colour converted image being clipped to spline boundaries. This construct is composited with a second image.

Although the non-transparent area of a graphical element may of itself be of a certain size, it need not be entirely visible in a final image, or only a portion of the element may have an effect on the final image. For example, assume an image of a certain size is to be displayed on a display. If the image is positioned so that only the top left corner of the image is displayed by the display device, the remainder of the image is not displayed. The final image as displayed on the display device thus comprises the visible portion of the image, and the invisible portion in such a case need not be rendered.

Another way in which only a portion of an element may have an effect is when the portion is obscured by another element. For example, a final image to be displayed (or rendered) may comprise one or more opaque graphical elements, some of which obscure other graphical elements. Hence, the obscured elements have no effect on the final image.

A conventional compositing model considers each node to be conceptually infinite in extent. Therefore, to construct the final image, a conventional system would apply a compositing equation at every pixel of the output image. Interactive frame rates of the order greater than 15 frames per second can be achieved by relatively brute-force approaches in most current systems, because the actual pixel operations are quite simple and can be highly optimised. This highly optimised code is fast enough to produce acceptable frame rates without requiring complex code. However, this is certainly not true in a compositing environment.

The per-pixel cost of compositing is quite high. This is because typically an image is rendered in 24-bit colour in addition to an 8-bit alpha channel, thus giving 32 bits per pixel. Each compositing operator has to deal with each of the four channels. Therefore, the approach of completely generating every pixel of every required frame when needed is inefficient, because the per-pixel cost is too high.

Problems arise with prior art methods when rendering graphical objects which include transparent and partially-transparent areas. Further, such methods typically do not handle the full range of compositing operators.

SUMMARY OF THE INVENTION

It is an object of the present invention to substantially overcome, or ameliorate, one or more of the deficiencies of the above mentioned methods by the provision of a method for creating an image made up by compositing multiple components.

According to one aspect of the present invention there is provided a method of creating an image, said image being formed by rendering at least a plurality of graphical objects to be composited according to a compositing expression, each said object having a predetermined outline, said method comprising the steps of:

dividing a space in which said outlines are defined into a plurality of mutually exclusive regions wherein each of said regions is defined by a region outline substantially following at least one of said predetermined outlines or parts thereof;

examining each said region to determine those said objects which contribute to said region;

modifying said compositing expression on the basis of the contribution of each of said objects within said region to form an optimized compositing expression for each said region; and compositing said image using each of said optimized compositing expressions.

According to another aspect of the present invention there is provided a method of creating an image, said image being formed by rendering at least a plurality of graphical objects to be composited according to a compositing expression, each said object having a predetermined outline, said method comprising the steps of:

dividing a space in which said outlines are defined into a plurality of mutually exclusive regions;

examining each said region to determine those said objects which contribute to said region;

modifying said compositing expression on the basis of the contribution of each of said objects within said region; and compositing said image using said modified compositing expression.

According to still another aspect of the present invention there is provided a method of creating an image, said image comprising a plurality of graphical objects to be composited according to a compositing expression, said method comprising the steps of:

dividing a space in which said graphical objects are defined into a plurality of regions;

examining each said region to determine those said objects which contribute to said region;

modifying said compositing expression on the basis of said examination; and compositing said image using said modified compositing expression.

According to still another aspect of the present invention there is provided an apparatus for creating an image, said image being formed by rendering at least a plurality of graphical objects to be composited according to a compositing expression, each said object having a predetermined outline, said apparatus comprising:

dividing means for dividing a space in which said outlines are defined into a plurality of mutually exclusive regions wherein each of said regions is defined by a region outline substantially following at least one of said predetermined outlines or parts thereof;

examining means for examining each said region to determine those said objects which contribute to said region;

modifying means for modifying said compositing expression on the basis of the contribution of each of said objects within said region to form an optimized compositing expression for each said region; and compositing means for compositing said image using each of said optimized compositing expressions.

According to still another aspect of the present invention there is provided an apparatus for creating an image, said image being formed by rendering at least a plurality of graphical objects to be composited according to a compositing expression, each said object having a predetermined outline, said apparatus comprising:

dividing means for dividing a space in which said outlines are defined into a plurality of mutually exclusive regions;

examining means for examining each said region to determine those said objects which contribute to said region;

modifying means for modifying said compositing expression on the basis of the contribution of each of said objects within said region; and compositing means for compositing said image using said modified compositing expression.

According to still another aspect of the present invention there is provided an apparatus for creating an image, said image comprising a plurality of graphical objects to be composited according to a compositing expression, said apparatus comprising:

dividing means for dividing a space in which said graphical objects are defined into a plurality of regions;

examining means for examining each said region to determine those said objects which contribute to said region;

modifying means for modifying said compositing expression on the basis of said examination; and compositing means for compositing said image using said modified compositing expression.

According to still another aspect of the present invention there is provided a method of creating a series of images, each member of said series being related to a preceding member, said images being formed by rendering a plurality of graphical objects to be composited according to a hierarchical structure representing a compositing expression, said hierarchical structure including a plurality of nodes each representing a component of at least one of said images, each of said objects having a predetermined outline, said method comprising the steps of:

(a) for each said node:
  (i) dividing a component image space in which said outlines are defined into at least one mutually exclusive region, each said region being related to at least one graphical object;
  (ii) examining each said region to determine those objects that contribute to the region;

(b) creating internodal dependency information identifying those said regions that will be affected by a change in any one of said regions;

(c) rendering a first image of said series by compositing all regions substantially according to said hierarchical structure;

(d) in response to at least one change to at least one of said nodes;
  (i) examining said internodal dependency information to identify those of said regions affected by said at least one change;
  (ii) for each node with affected regions, updating the corresponding identified regions and incorporating into said node those (any) new regions arising from the change and/or removing any of said regions that are no longer relevant;
  (iii) updating said internodal dependency information to reflect changes to said hierarchical structure;
  (iv) rendering a further image of said series by compositing (only) those regions affected by said at least one change; and (e) repeating step (d) for further changes to at least one of said nodes.

According to still another aspect of the present invention there is provided a method of creating a series of images, said images being formed by rendering a plurality of graphical objects to be composited according to a hierarchical structure, said hierarchical structure including a plurality of nodes each representing a component of at least one of said images, each of said objects having a predetermined outline, said method comprising the steps of:

(a) for each said node:
  (iii) dividing a space in which said outlines are defined into at least one mutually exclusive region;
  (iv) examining each said region to determine those objects that contribute to the region;

(b) creating internodal dependency information based on said examination;

(c) rendering a first image of said series utilising said hierarchical structure; and then, in response to at least one change to at least one of said nodes;

(d) examining said internodal dependency information;
  (i) for a node with affected regions, updating the corresponding regions;
  (ii) updating said internodal dependency information;
  (iii) rendering a further image of said series by compositing those regions affected by said at least one change; and
(e) repeating step (d) for further changes to at least one of said nodes.

According to still another aspect of the present invention there is provided a method of creating a series of images, said images being formed by rendering at least a plurality of graphical objects to be composited according to a hierarchical structure, said hierarchical structure including a plurality of nodes each representing a component of at least one of said images, said method comprising the steps of:

(a) for each said node:
  (i) dividing a component image space in which said graphical objects are defined into at least one region;
  (ii) examining each said region;
(b) creating internodal dependency information for each of said regions;
(c) rendering a first image of said series utilising said hierarchical structure; and then, in response to at least one change to at least one of said nodes;
(d) examining said internodal dependency information;
  (i) for a node with affected regions, updating the corresponding information;
  (ii) updating said internodal dependency record;
  (iii) rendering a further image of said series; and
(e) repeating step (d) for further changes to at least one of said nodes.

According to still another aspect of the present invention there is provided an apparatus for creating a series of images, each member of said series being related to a preceding member, said images being formed by rendering a plurality of graphical objects to be composited according to a hierarchical structure representing a compositing expression, said hierarchical structure including a plurality of nodes each representing a component of at least of one of said images, each of said objects having a predetermined outline, said apparatus comprising:

dividing means for dividing a component image space in which said outlines are defined, for each said node, into at least one mutually exclusive region, each said region being related to at least one graphical object;

first examining means for examining each said region, for each said node, to determine those objects that contribute to the region;

creating means for creating an internodal dependency information identifying those said regions that will be affected by a change in any one of said regions;

rendering means for rendering a first image of said series by compositing all regions substantially according to said hierarchical structure;

second examining means for examining said internodal dependency information to identify those of said regions affected by at least one change to at least one of said nodes;

first updating means for updating the corresponding identified regions for each node with affected regions and incorporating into said node those (any) new regions arising from the change;

second updating means for updating said internodal dependency information to reflect changes to said hierarchical structure; and rendering means for rendering a further image of said series by compositing (only) those regions affected by said at least one change.

According to still another aspect of the present invention there is provided an apparatus for creating a series of images, said images being formed by rendering at least a plurality of graphical objects to be composited according to a hierarchical structure, said hierarchical structure including a plurality of nodes each representing a component of at least one of said images, each of said objects having a predetermined outline, said apparatus comprising:

dividing means for dividing a space in which said outlines are defined, for each said node, into at least one mutually exclusive region;

first examining means for examining each said region, for each said node, to determine those objects that contribute to the region;

creating means for creating internodal dependency information based on said examination;

rendering means for rendering a first image of said series utilising said hierarchical structure; and second examining means for examining said internodal dependency information in response to at least one change to at least one of said nodes and, for a node with affected regions, updating the corresponding regions, updating said internodal dependency information and, rendering a further image of said series by compositing those regions affected by said at least one change.

According to still another aspect of the present invention there is provided an apparatus for creating a series of images, said images being formed by rendering at least a plurality of graphical objects to be composited according to a hierarchical structure, said hierarchical structure including a plurality of nodes each representing a component of at least one of said images, said apparatus comprising:

dividing means for dividing a component image space, for each said node, in which said graphical objects are defined into at least one region;

first examining means for examining each said region;

creating means for creating internodal dependency information for each of said regions;

rendering means for rendering a first image of said series utilising said hierarchical structure;

second examining means for examining said internodal dependency information, in response to at least one change to at least one of said nodes; and first updating means for updating the corresponding regions for an affected node;

second updating means for updating said internodal dependency information; and rendering means for rendering a further image of said series.

According to still another aspect of the present invention there is provided a computer program product including a computer readable medium having a plurality of software modules for creating an image, said image being formed by rendering at least a plurality of graphical objects to be composited according to a compositing expression, each said object having a predetermined outline, said computer program product comprising:

dividing module for dividing a space in which said outlines are defined into a plurality of mutually exclusive regions wherein each of said regions is defined by a region outline substantially following at least one of said predetermined outlines or parts thereof;

examining module for examining each said region to determine those said objects which contribute to said region;

modifying module for modifying said compositing expression on the basis of the contribution of each of said objects within said region to form an optimized compositing expression for each said region; and compositing module for compositing said image using each of said optimized compositing expressions.

According to still another aspect of the present invention there is provided a computer program product including a computer readable medium having a plurality of software modules for creating an image, said image being formed by rendering at least a plurality of graphical objects to be composited according to a compositing expression, each said object having a predetermined outline, said computer program product comprising:

dividing module for dividing a space in which said outlines are defined into a plurality of mutually exclusive regions;

examining module for examining each said region to determine those said objects which contribute to said region;

modifying module for modifying said compositing expression on the basis of the contribution of each of said objects within said region; and compositing module for compositing said image using said modified compositing expression.

According to still another aspect of the present invention there is provided a computer program product including a computer readable medium having a plurality of software modules for creating an image, said image comprising a plurality of graphical objects to be composited according to a compositing expression, said computer program product comprising:

dividing module for dividing a space in which said graphical objects are defined into a plurality of regions;

examining module for examining each said region to determine those said objects which contribute to said region;

modifying module for modifying said compositing expression on the basis of said examination; and compositing module for compositing said image using said modified compositing expression.

According to still another aspect of the present invention there is provided a computer program product including a computer readable medium having a plurality of software modules for creating a series of images, each member of said series being related to a preceding member, said images being formed by rendering a plurality of graphical objects to be composited according to a hierarchical structure representing a compositing expression, said hierarchical structure including a plurality of nodes each representing a component of at least one of said images, each of said objects having a predetermined outline, said computer program product comprising:

dividing module for dividing a component image space in which said outlines are defined, for each said node, into at least one mutually exclusive region, each said region being related to at least one graphical object;

first examining module for examining each said region, for each said node, to determine those objects that contribute to the region;

creating module for creating an internodal dependency information identifying those said regions that will be affected by a change in any one of said regions;

rendering module for rendering a first image of said series by compositing all regions of said hierarchical structure;

second examining module for examining said internodal dependency information to identify those of said regions affected by at least one change to at least one of said nodes;

first updating module for updating the corresponding identified regions for each node with affected regions and incorporating into said node those (any) new regions arising from the change;

second updating module for updating said internodal dependency information to reflect changes to said hierarchical structure; and rendering module for rendering a further image of said series by compositing (only) those regions affected by said at least one change.

According to still another aspect of the present invention there is provided a computer program product including a computer readable medium having a plurality of software modules for creating a series of images, said images being formed by rendering a plurality of graphical objects to be composited according to a hierarchical structure, said hierarchical structure including a plurality of nodes each representing a component of at least one of said images, each of said objects having a predetermined outline, said computer program product comprising:

dividing module for dividing a space in which said outlines are defined, for each said node, into at least one mutually exclusive region;

first examining module for examining each said region, for each said node, to determine those objects that contribute to the region;

creating module for creating an internodal dependency information based on said examination;

rendering module for rendering a first image of said series utilising said hierarchical structure; and second examining module for examining said internodal dependency information in response to at least one change to at least one of said nodes and, for a node with affected regions, updating the corresponding regions, updating said internodal dependency information and, rendering a further image of said series by compositing those regions affected by said at least one change.

According to still another aspect of the present invention there is provided a computer program product including a computer readable medium having a plurality of software modules for creating a series of images, said images being formed by rendering a plurality of graphical objects to be composited according to a hierarchical structure, said hierarchical structure including a plurality of nodes each representing a component of said image, said computer program product comprising:

dividing module for dividing a component image space, for each said node, in which said graphical objects are defined into at least one region;

first examining module for examining each said region;

creating module for creating internodal dependency information for each of said regions;

rendering module for rendering a first image of said series utilising said hierarchical structure;

second examining module for examining said internodal dependency information, in response to at least one change to at least one of said nodes; and first updating module for updating the corresponding regions for a node with affected regions;

second updating module for updating said internodal dependency information; and rendering module for rendering a further image of said series.

According to still another aspect of the present invention there is provided a method of processing image data for creating an image by rendering graphical objects to be composited according to a compositing expression, comprising the steps of:

dividing a space in which said objects are defined into a plurality of regions in accordance with outlines of the objects;

examining a part of the space by utilizing each said region; and modifying the compositing expression based on a result of said examining step.

BRIEF DESCRIPTION OF THE DRAWINGS

Embodiments of the present invention will now be described with reference to the following drawings.

DETAILED DESCRIPTION 1.0 Underlying Principles

The basic shape of operands to compositing operators in most current systems is the rectangle, regardless of the actual shape of the object being composited. It is extremely easy to write an operator which composites within the intersection area of two bounding boxes. However, as a bounding box typically does not accurately represent the actual bounds of a graphical object, this method results in a lot of unnecessary compositing of completely transparent pixels over completely transparent pixels. Furthermore, when the typical make-up of a composition is examined, it can be noticed that areas of many of the objects are completely opaque. This opaqueness can be exploited during the compositing operation. However, these areas of complete opaqueness are usually non-rectangular and so are difficult to exploit using compositing arguments described by bounding boxes. If irregular regions are used for exploiting the opaque objects, then these regions could be combined in some way to determine where compositing should occur. Furthermore, if any such region is known to be fully transparent or fully opaque, further optimisations are possible.

Most current systems fail to exploit similarities in composition between one frame and the next. It is rare for everything to change from frame to frame and therefore large areas of a compositing tree will remain unchanged. An example of this is where a cartoon type character comprising multiple graphical objects is rendered on a display. If, for example, the character spilt some paint on its shirt in the next frame, then it is not necessary to render the entire image again. For example, the head and legs of the character may remain the same. It is only necessary to render those components of the image that have been altered by the action. In this instance, the part of the shirt on which the paint has been spilt may be re-rendered to be the same colour as the paint, whilst the remainder of the character stays the same. Exploiting this principle may provide large efficiency improvements. If incremental changes are made to the compositing tree, then only a reduced amount of updating is necessary to affect the change.

Figure 1:
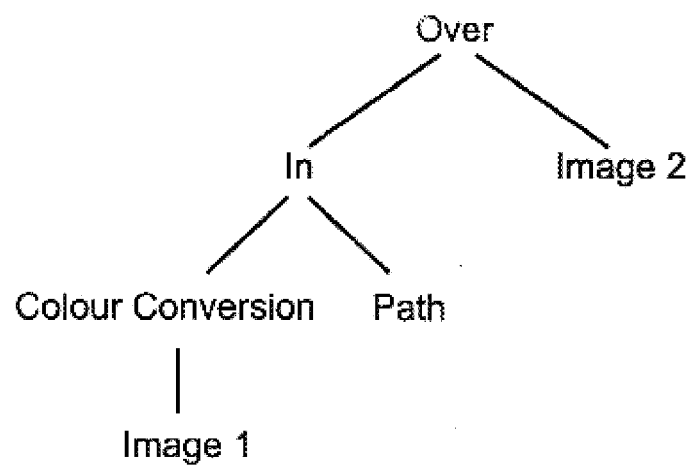
FIG. 1 is an example of a compositing tree.

Many current graphical systems use what is known as an immediate mode application program interface (API). This means that for each frame to be rendered, the complete set of rendering commands is sent to the API. However, sending the complete set of rendering commands to the API is somewhat inefficient in a compositing environment, as typically, large sections of the compositing tree will be unchanged from one frame to the next, but would be completely re-rendered anyway in immediate mode. The preferred embodiment, on the other hand, is considered by the present inventors to be best described as a retained mode API. Retained mode means that instead of providing the complete compositing tree on a per-frame basis, the user provides an initial compositing tree, and then modifies it on a per-frame basis to effect change. Changes which can be made to the tree include geometrically transforming part or all of the tree, modifying the tree structure (unlinking and linking subtrees), and modifying attributes (e.g.: color) of individual nodes. Note that such modifications may not necessarily mean that the tree structure, for example as seen in FIG. 1, will change where only the attributes of an individual node have been modified.

The rendering operation of the preferred embodiments is a combination of a number of techniques and assumptions which combine to provide high quality images and high frame rates. Some of the contributing principles are:

(i) The use of irregular regions to minimise per-pixel compositing. For example, if one graphical object is on top of another, then pixel compositing is only needed inside the area where the two objects intersect. Having the ability to use irregular regions gives the ability to narrow down areas of interest much more accurately.

(ii) An assumption is made that in the transition from one frame to the next, only part of the tree will change. This can be exploited by caching away expensive-to-generate information regarding the composition so that it can be re-used from one frame to the next. Examples of expensive-to-generate information are—regions of interest (boundaries of areas of intersection between objects etc); pixel data (representing expensive composites etc); and topological relationships between objects.

(iii) If an opaque object is composited with another object using the OVER operator, then the opaque object completely obscures what it is composited onto (inside the opaque objects area). This is a very useful property because it means that no expensive pixel compositing is required to achieve the output pixel within the area of overlap. (The pixel value is the same as that at the equivalent spot on the opaque object). Opaque objects induce similar behaviour in most of the compositing operators. Therefore, the preferred embodiments attempts to exploit opaque areas as much as possible.

Figure 23:
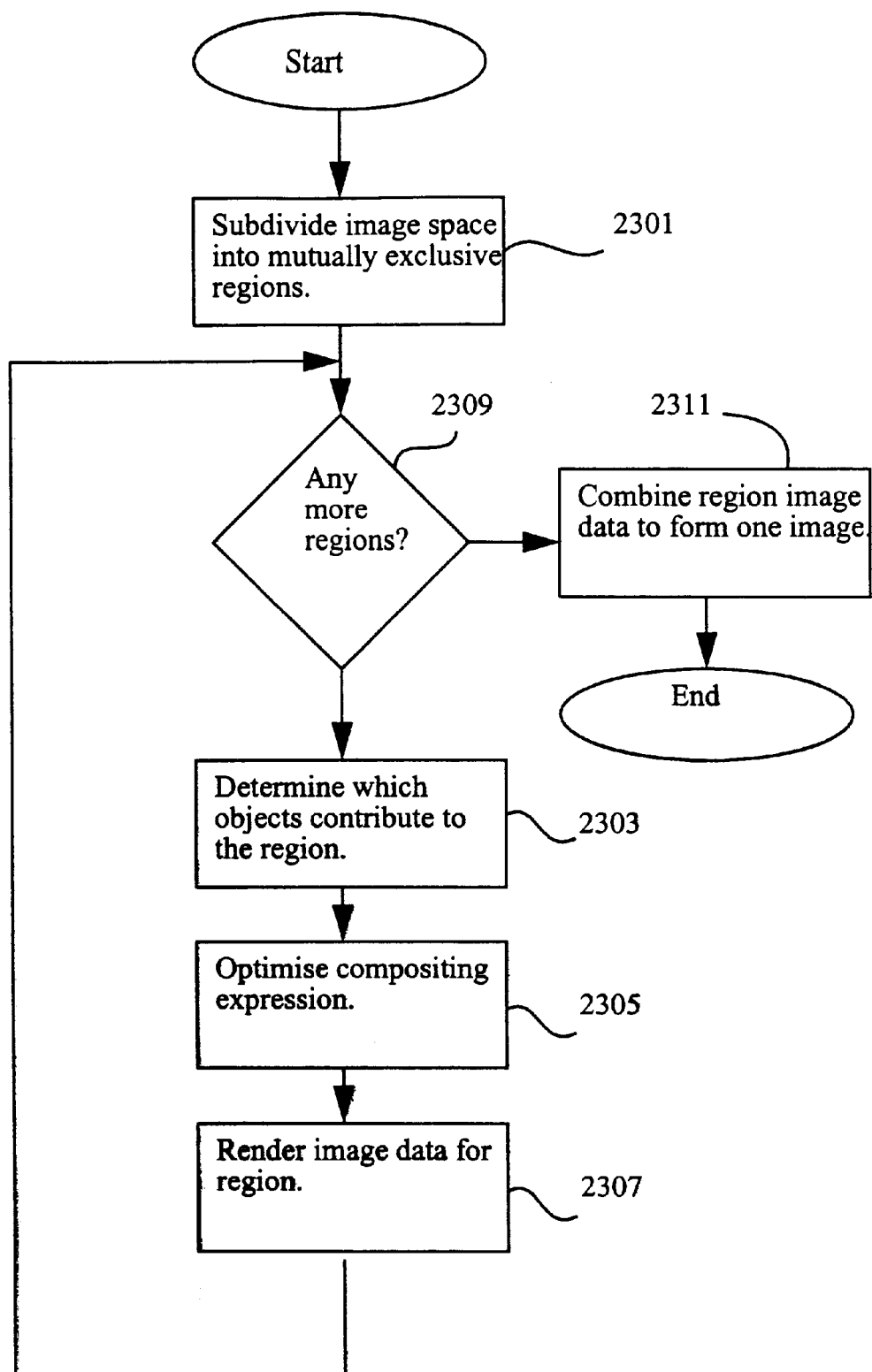
FIG. 23 is a flowchart showing a method of creating an image in accordance with the preferred embodiments.

FIG. 23 is a flowchart showing a method of creating an image in accordance with the preferred embodiments of the present invention. The image is formed by rendering graphical objects to be composited according to a compositing expression. The process begins at step 2301, where a space in which the object boundary outlines are defined is divided into a number of mutually exclusive regions. Each of the regions is defined by at least one of the predetermined region boundary outlines or parts thereof. The process of dividing the space into a number of regions and manipulating those regions is described in detail particularly with reference to section 2.3 below. Section 2.3 includes two pseudocode listings which describe step 2301 for the "OVER" and "IN" compositing operations. The process continues at step 2303, where one of the regions is selected and examined to determine which objects contribute to the region. At the next step 2305, a compositing expression corresponding to the selected region is modified on the basis of the contribution of each of the objects within the region to form an optimised compositing expression for that region. The process of examining each of the regions and modifying the compositing expression is described in detail particularly with reference to section 2.4 below. Section 2.4 includes two pseudocode listings which describe 2303 and 2305 for the "OVER" and "IN" compositing operations. The process continues at step 2307, where image data for the selected region is rendered. At the next step 2309, a check is carried out to determine if any more regions require processing. If more regions require processing, then the process continues to step 2303, where another region is selected. Alternatively, if all of the mutually exclusive regions have been processed, the process concludes at step 2311, where region data for all of the regions is combined to form one image. Steps 2307, 2309 and 2311 are described in detail with reference to section 2.6, below, which includes a pseudocode listing.

2.0 Basic Static Rendering

Static Rendering deals with the problem of generating a single image from a compositing tree as quickly as possible. Some of the pixel compositing methods of the preferred embodiments will be explained using a static rendering example.

Figure 2:
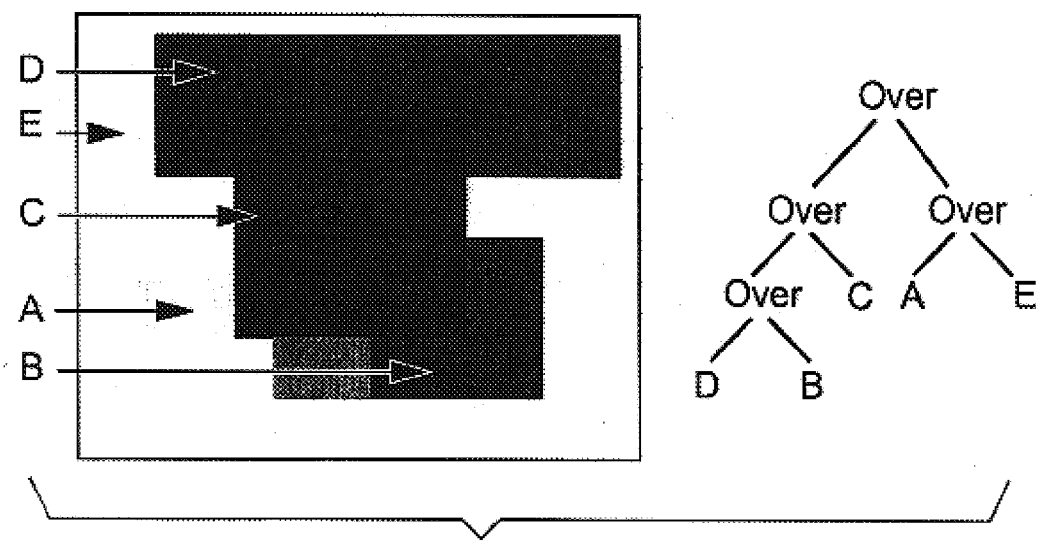
FIG. 2 illustrates an image containing a number of overlapping objects and the corresponding compositing tree.

An example of a simple compositing tree which consists of leaf node objects and only using the "OVER" operator is shown in FIG. 2. Conventionally, each node is considered to be conceptually infinite in extent. One method to construct the final image is to apply the compositing equation (((D OVER B) OVER C) OVER (A OVER E)) at every pixel of the output image. However, this is quite an inefficient method.

Figure 3:
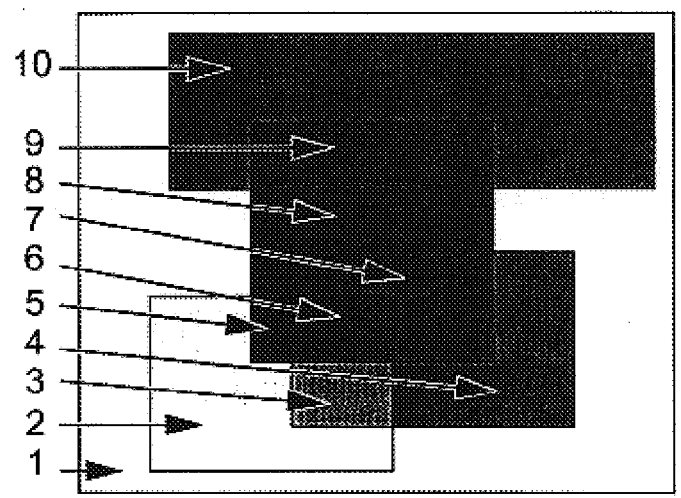
FIG. 3 shows the image of FIG. 2 illustrating the different regions which exist in the image and listing the compositing expression which would be used to generate the pixel data for each region.

A composition can generally be subdivided into a number of mutually exclusive irregular regions. The above compositing expression may be simplified independently within each region. In the example of FIG. 2, A, C and E represent opaque objects. B and D, on the other hand are partially transparent. FIG. 3 shows the different regions (1–10) produced using the five objects which exist in the example, and the compositing expression which would be used to generate the pixel data for each specific region.

Figure 4:
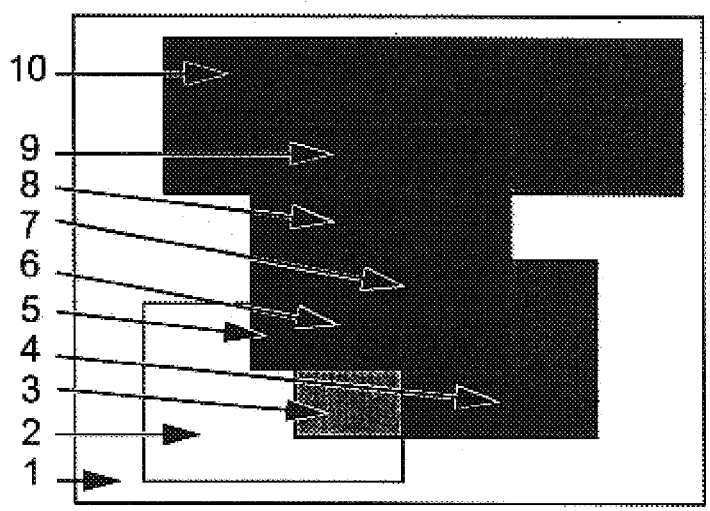
FIG. 4 is the image of FIG. 3, illustrating the compositing operations after being optimised according to one example of the preferred embodiments.

The compositing expressions provided in FIG. 3 make no attempt to exploit the properties of the object's opacity. If these properties are used to simplify the compositing expressions for each region, the expressions of FIG. 4 are obtained resulting in a simplification of the rendering of regions 2, 3, 5, 6, 7, 8 and 9 compared with FIG. 3. These simplified compositing expressions would result in far fewer pixel compositing operations being performed to produce the final picture.

FIG. 4 represents the region subdivision for the root of the compositing tree. However, every node in the compositing tree can itself be considered the root of a complete compositing tree. Therefore, every node in the compositing tree can have associated with it a group of regions which together represent the region subdivision of the subtree of which the node is the root. Region subdivision provides a convenient means of managing the complexity of a compositing tree and an efficient framework for caching expensive data.

Using the principles noted above, a compositing expression can be simplified dependent upon whether the graphical objects being composited are wholly opaque, wholly transparent or otherwise (herewith deemed "ordinary").

Figure 20:
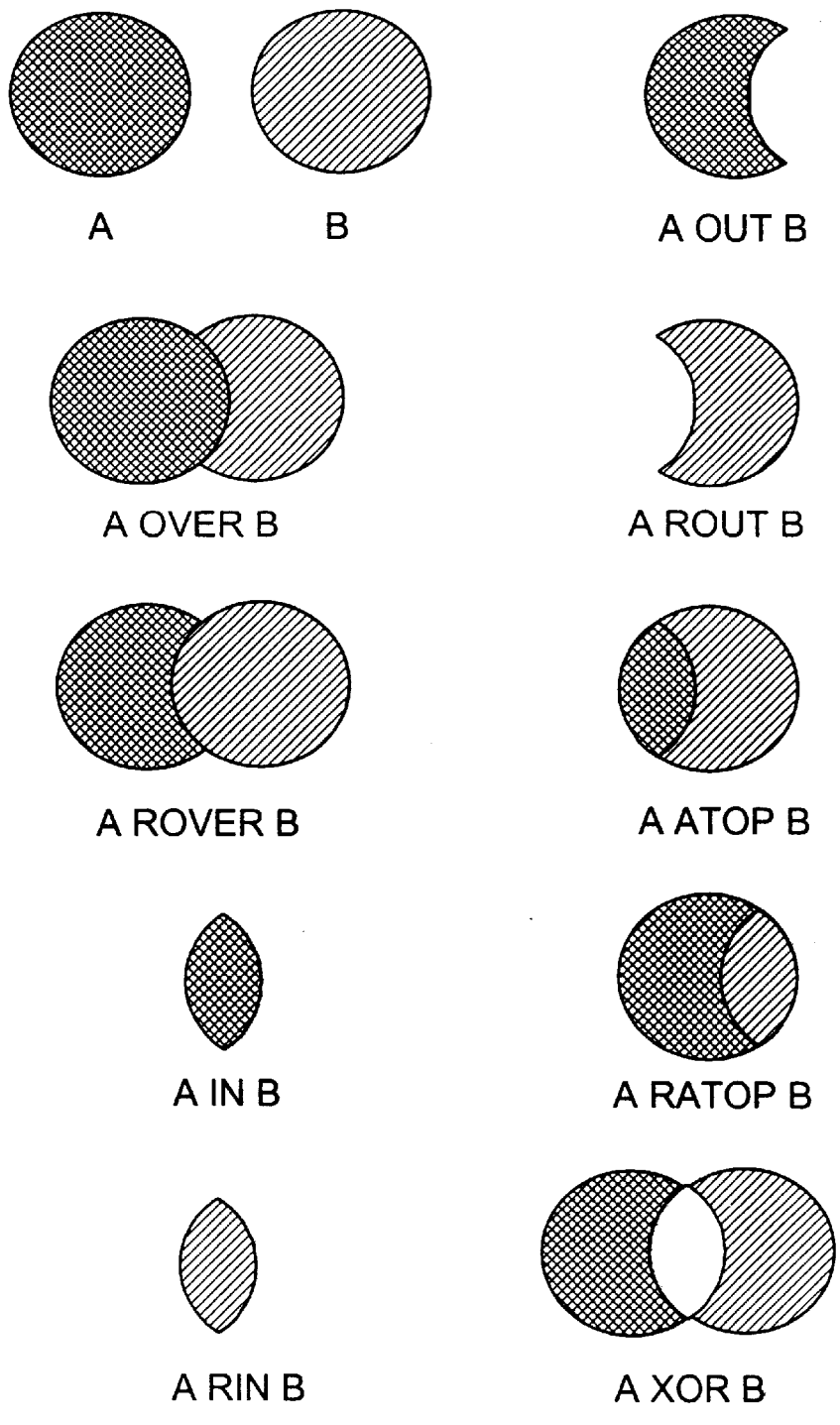
FIG. 20 depicts the result of a variety of compositing operators useful with the present invention.

Table 1 shows how the compositing operations of FIG. 20 can be simplified when one or both operands are opaque or transparent.

TABLE 1

| Expression | A's opacity | B's opacity | Optimised |
|---|---|---|---|
| AoverB | Transparent | Transparent | neither |
|  | Transparent | Ordinary | B |

TABLE 1-continued

| Expression | A's opacity | B's opacity | Optimised |
|---|---|---|---|
| | Transparent | Opaque | B |
| | Ordinary | Transparent | A |
| | Ordinary | Ordinary | AoverB |
| | Ordinary | Opaque | AoverB |
| | Opaque | Transparent | A |
| | Opaque | Ordinary | A |
| | Opaque | Opaque | A |
| AroverB | Transparent | Transparent | neither |
| | Transparent | Ordinary | B |
| | Transparent | Opaque | B |
| | Ordinary | Transparent | A |
| | Ordinary | Ordinary | BoverA |
| | Ordinary | Opaque | B |
| | Opaque | Transparent | A |
| | Opaque | Ordinary | BoverA |
| | Opaque | Opaque | B |
| AinB | Transparent | Transparent | neither |
| | Transparent | Ordinary | neither |
| | Transparent | Opaque | neither |
| | Ordinary | Transparent | neither |
| | Ordinary | Ordinary | AinB |
| | Ordinary | Opaque | A |
| | Opaque | Transparent | neither |
| | Opaque | Ordinary | AinB |
| | Opaque | Opaque | A |
| ArinB | Transparent | Transparent | neither |
| | Transparent | Ordinary | neither |
| | Transparent | Opaque | neither |
| | Ordinary | Transparent | neither |
| | Ordinary | Ordinary | BinA |
| | Ordinary | Opaque | BinA |
| | Opaque | Transparent | neither |
| | Opaque | Ordinary | B |
| | Opaque | Opaque | B |
| AoutB | Transparent | Transparent | neither |
| | Transparent | Ordinary | neither |
| | Transparent | Opaque | neither |
| | Ordinary | Transparent | A |
| | Ordinary | Ordinary | AoutB |
| | Ordinary | Opaque | neither |
| | Opaque | Transparent | A |
| | Opaque | Ordinary | AoutB |
| | Opaque | Opaque | neither |
| AroutB | Transparent | Transparent | neither |
| | Transparent | Ordinary | B |
| | Transparent | Opaque | B |
| | Ordinary | Transparent | neither |
| | Ordinary | Ordinary | BoutA |
| | Ordinary | Opaque | BoutA |
| | Opaque | Transparent | neither |
| | Opaque | Ordinary | neither |
| | Opaque | Opaque | neither |
| AatopB | Transparent | Transparent | neither |
| | Transparent | Ordinary | B |
| | Transparent | Opaque | B |
| | Ordinary | Transparent | neither |
| | Ordinary | Ordinary | AatopB |
| | Ordinary | Opaque | AatopB |
| | Opaque | Transparent | neither |
| | Opaque | Ordinary | AatopB |
| | Opaque | Opaque | A |
| AratopB | Transparent | Transparent | neither |
| | Transparent | Ordinary | neither |
| | Transparent | Opaque | neither |
| | Ordinary | Transparent | A |
| | Ordinary | Ordinary | BatopA |
| | Ordinary | Opaque | BatopA |
| | Opaque | Transparent | A |
| | Opaque | Ordinary | BatopA |
| | Opaque | Opaque | B |
| AxorB | Transparent | Transparent | neither |
| | Transparent | Ordinary | B |
| | Transparent | Opaque | B |
| | Ordinary | Transparent | A |
| | Ordinary | Ordinary | AxorB |
| | Ordinary | Opaque | AxorB |
| | Opaque | Transparent | A |
| | Opaque | Ordinary | AxorB |
| | Opaque | Opaque | neither |

2.1 Basic Data Model

Associated with every node in a compositing tree is a group of mutually exclusive regions which together represent the non-transparent area of the node. It should be noted that the region descriptions that the preferred embodiments uses are generally not pixel accurate. A region may in fact contain some transparent pixels. However, any point lying outside of all the regions at a node is certain to be transparent. The set of the mutually exclusive regions at a node is known as a region group. A leaf node region group may contain only one or two regions. The region group at the root of the tree may contain hundreds of regions. Each region in a region group contains the following basic data:

(i) A Region Description is a low-level representation of the boundaries of the region. The region descriptions of all the regions in a region group must be mutually exclusive (non-intersecting). However, the preferred embodiments is not limited to using axis-parallel (ie: every side parallel or perpendicular to a scan line of an output device) region descriptions. The preferred embodiments allows region descriptions which more closely represent arbitrary shaped regions.

(ii) A Proxy is some means of caching the pixel data resulting from applying the operations specified by the compositing expression at every pixel inside the region description. A proxy can be as simple as a 24-bit colour bitmap, or something much more complicated (such as a run-length encoded description). Fundamentally, a proxy simply has to represent pixel data in some way which makes it efficient to retrieve and use.

Every region group also contains a region description which is the union of all the region descriptions of the regions in the region group. The region description essentially represents the entire coverage of the region group.

2.2 Region Descriptions and Region Arithmetic

The region arithmetic and data structure of the preferred embodiments has the following properties:

to allow the representation of complex regions, including convex regions, concave regions and regions with holes. This is necessary so that a region will be reasonably able to follow the geometry of the graphic object it represents;

is space efficient. In a complicated composition there will be many regions. For memory efficiency, it is therefore preferable that the cost of storing these regions is reasonably small;

the region arithmetic should support basic set operations—Union, Intersection and Difference;

the above-noted basic operations should be efficient in terms of speed. In a complex compositing tree, it is possible that a large amount of region arithmetic will be undertaken. A poor implementation of region arithmetic could lead to the time taken by region arithmetic being greater than the time saved from the reduction in per-pixel compositing;

it is advantageous if the region description can be geometrically translated efficiently. In cases where a graphic object is translated, the graphic objects associated regions can then be translated quickly; and it is sometimes helpful to be able to quickly compare two regions to determine if they are the same. It is not necessary to obtain any other statistics on their similarity, simple equality is all that is required.

Two conventional region description techniques were considered and rejected for the preferred embodiment. These were Polygons A polygon can be used to represent almost any object, the disadvantage of using a polygon, however, is that a polygon's generality makes implementing the set operations slow and inefficient.

Quadtrees

Using quadtrees, set operations are easy to implement and are quite efficient. In addition, they can represent a wide variety of regions given sufficient granularity (all edges in a quadtree have to be axis-parallel). Their major failing is that all quadtrees must be aligned on the same grid (granularity). This means that it is impossible to simply translate a quadtree by an arbitrary amount. Unless that amount is a multiple of the underlying grid size, the quadtree will need to be recalculated from the object it describes (otherwise it will keep growing). Therefore, quadtrees are not suitable in application domains where geometric translation is a frequent operation.

Figure 16:
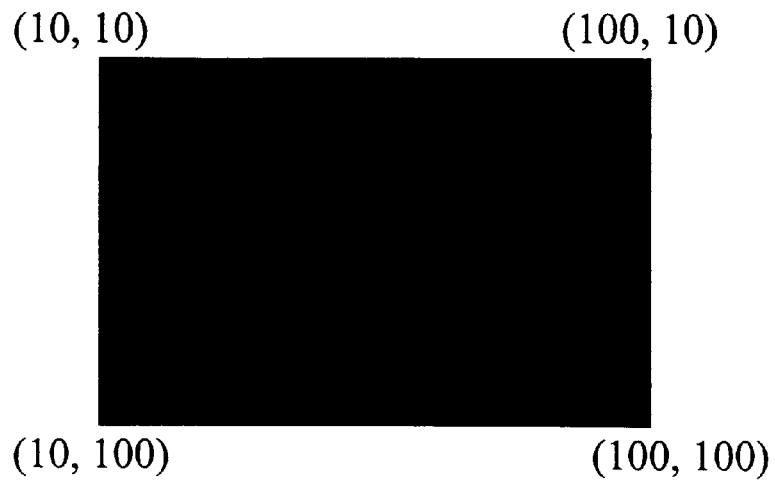
FIG. 16 illustrates a region and its x and y co-ordinates.

The region description data structure of the preferred embodiments can be understood by imagining that along a vertical line every coordinate has a state which is one of either inside or outside the region. The data structure stores those y co-ordinates at which some change of state between inside and outside occurs. For each such y co-ordinate, the data contains spans of coordinates each of which toggles the state of every vertical line running through the data. Each span of x co-ordinates is called a run. The sequence of runs associated with a y co-ordinate is called a row. For example, the region of FIG. 16 could be described by the following:

row y=10:x=10, x=100
    row y=100:x=10, x=100

Figure 17:
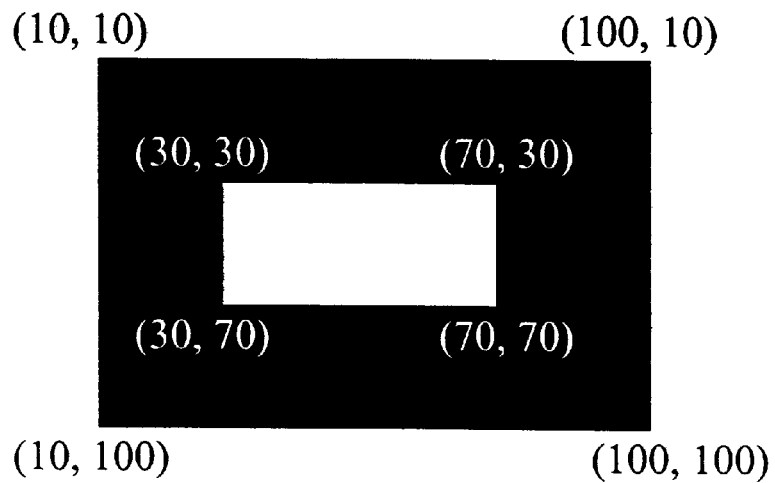
FIG. 17 illustrates two regions and their x and y co-ordinates.

Similarly, the regions of FIG. 17 could be described by the following:

row y=10:x=10, x=100
    row y=30:x=30, x=70
    row y=70:x=30, x=70
    row y=100:x+10, x=100

The data representing a region is represented by an array of integer values. There are two "special" values

R_NEXT_IS_Y

A beginning-of-row marker. Indicates that the next integer in the sequence will represent a y coordinate.

R_EOR

Stands for End-of-Region. Indicates that the region description has finished.

All other values represent x or y coordinates. The x coordinates in a row represent runs. The first two co-ordinates represent a run, then the next two represent the next run and so on. Therefore, the x coordinates in a row should always be increasing. Also, there should always be an even number of x-coordinates in a row. The region data stream for FIG. 17 is shown below.

R_NEXT_IS_Y 10 10 100

R_NEXT_IS_Y 30 30 70

R_NEXT_IS_Y 70 30 70

R_NEXT_IS_Y 100 10 100

R_EOR

The preferred embodiments also contains bounding box of the region, as this is useful in certain set operations.

Figure 5:
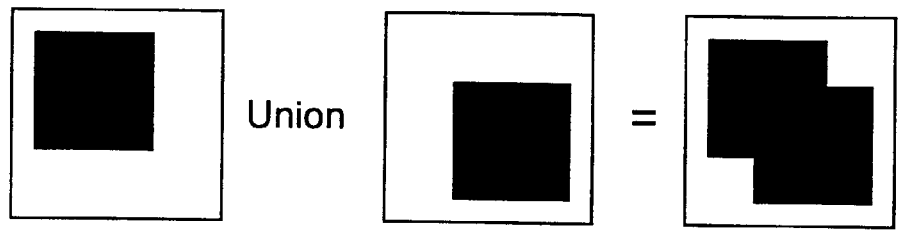
FIG. 5 illustrates the result of combining two region descriptions using the Union operation according to the preferred embodiments.

As seen in FIG. 5, if two region descriptions are combined using a Union operation, then the resultant region description will describe an area in which either region is active.

Figure 6:
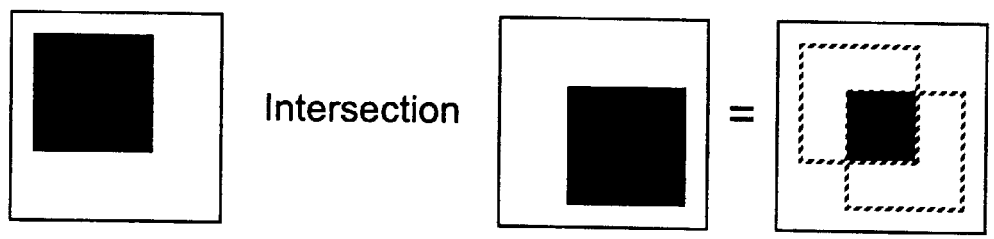
FIG. 6 illustrates the result of combining two region descriptions using the Intersection operation according to the preferred embodiments.

As seen in FIG. 6, if two region descriptions are combined using the Intersection operation, then the resultant region description will describe an area in which both the region descriptions are active.

Figure 7:
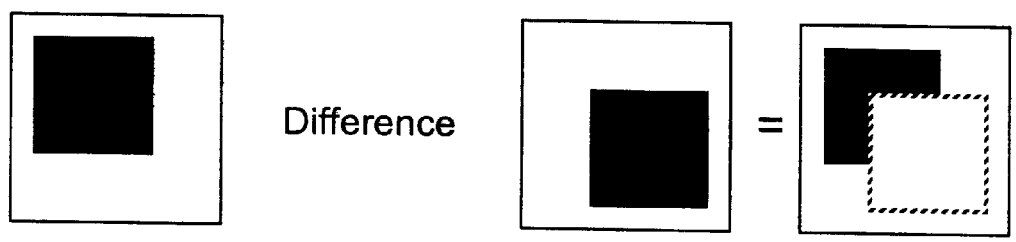
FIG. 7 illustrates the result of combining two region descriptions using the Difference operation according to the preferred embodiments.

If two region descriptions are combined using the Difference operation, then the resultant region description will describe an area in which only the first region is active, as seen in FIG. 7.

2.3 Constructing Region Groups 2.3.1 Constructing Leaf Node Region Groups

A region group for a leaf node will typically contain one or more regions, which together fully contain the non-transparent area of the graphical object represented by the leaf node. Typically, the non-transparent area is divided into regions where each region has some property that facilitates optimization. For example, the non-transparent area of some graphical object can be divided into two regions, one fully opaque and the other with ordinary opacity. The above mentioned compositing optimizations would apply where the opaque region is composited.

Alternatively, the leaf node could be subdivided based on some other attribute. For example, a leaf node could be divided into two regions, one representing an area of constant colour, the other representing blended colour. Areas of constant colour may be composited more efficiently than areas with more general colour description.

2.3.1.1 Region Formation and Phasing

When creating regions, it is not always beneficial that region boundaries follow graphical object boundaries precisely. What is important is that any property that facilitates optimization is valid at all points within a region said to have that property. For example, an opaque circle could be covered exactly by one circular region which is classified as opaque, or by two approximate regions, one fully opaque octagonal region inscribed in the circle, and one annular octagonal region of ordinary opacity that includes the remainder of the circle plus some area exterior to the circle.

There is typically a trade-off between how closely region boundaries follow graphical object boundaries and the benefits obtained. If region boundaries follow object boundaries very closely, a lot of work is usually involved in creating the region boundaries and in performing intersections and differences of regions (the reasons for needing to perform such operations are explained in later sections). However, if region boundaries are too approximate, they may either include large areas that are outside the objects' boundaries, resulting in too much unnecessary compositing, or they may fail to include large areas where known properties lead to optimization.

One approach, as illustrated in the appendix, is to limit region boundaries to sequences of horizontal and vertical segments. Using this approach, the typical segment size is chosen so that there is neither too much detail so that the region operations are overburdened, nor too much approximation to result in wasted compositing or insufficient optimization.

One method to improve the efficiency of region operations is to choose as many, as is practical, of the horizontal and vertical segments of substantially all region boundaries to be in phase. In other words, the horizontal and vertical segments are to be chosen from the horizontal and vertical lines of the same grid. The grid need not be regularly spaced, nor have the same spacing horizontally and vertically, although typically it will.

Figure 21:
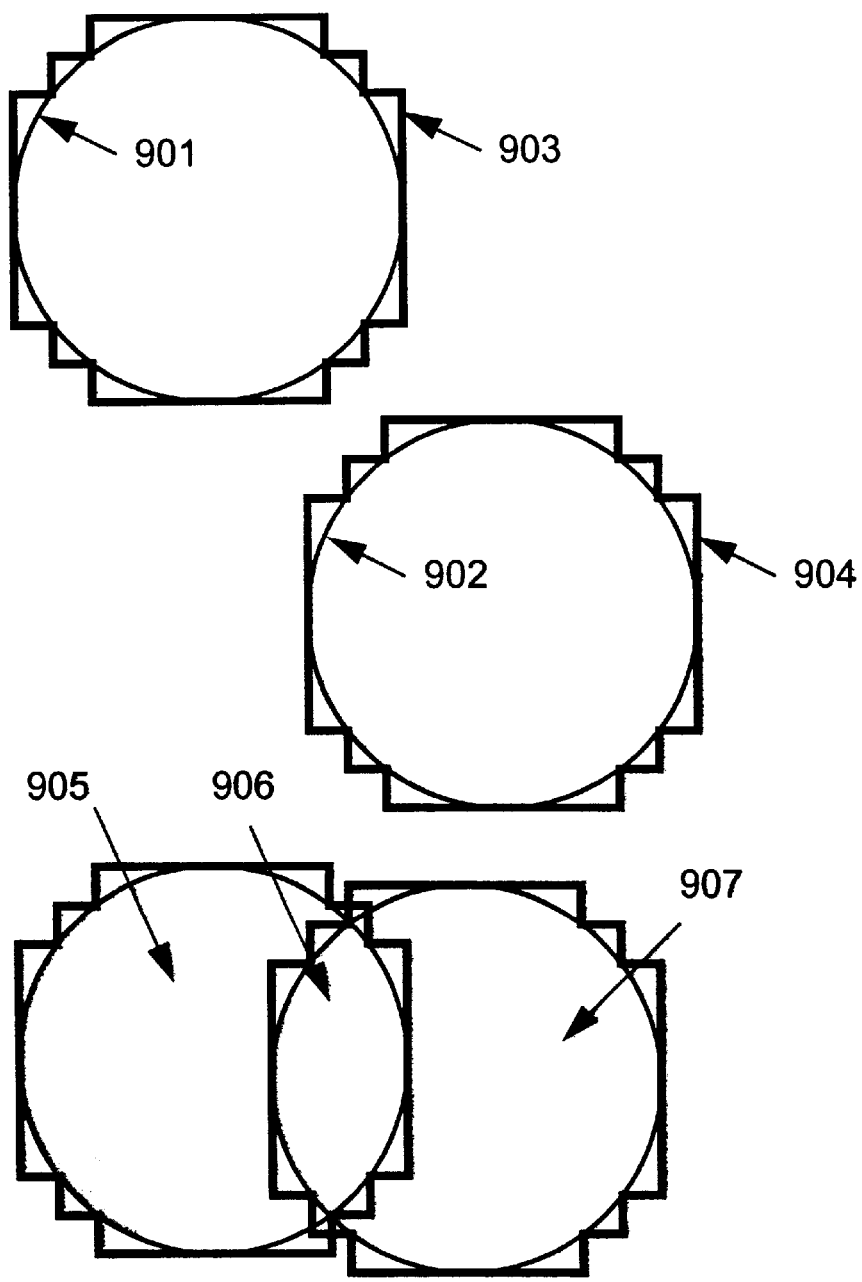
FIG. 21 illustrates regions formed by combining two circles with non-grid-aligned regions.
Figure 22:
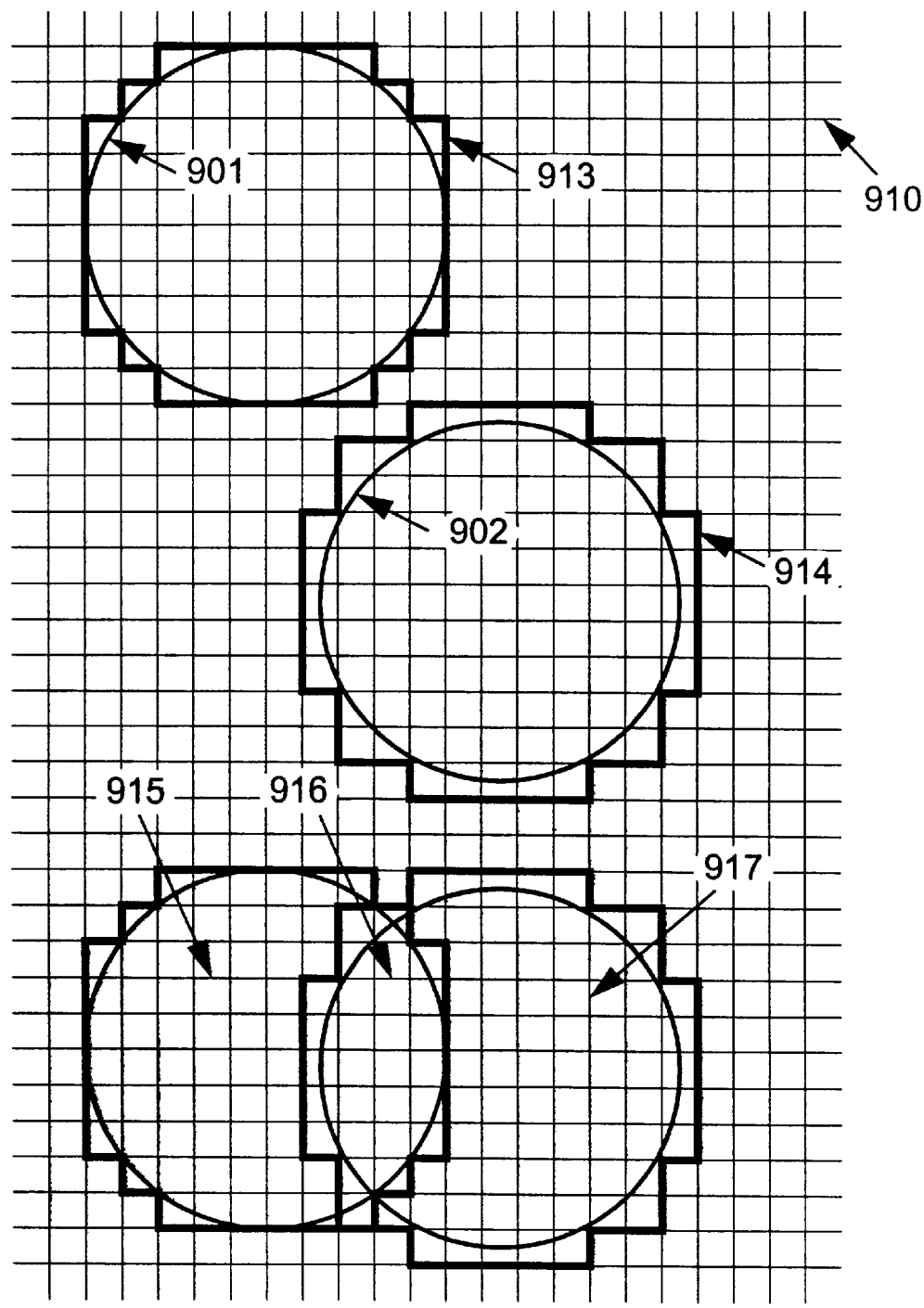
FIG. 22 illustrates improved regions formed by combining two circles with grid-aligned regions.

Choosing the horizontal and vertical segments from the horizontal and vertical lines of the same grid improves the efficiency of region operations by seeking to keep all region boundary detail to the level of detail contained in the underlying grid. Without constraining the majority of region boundary segments to a grid, region operators such as difference and intersection tend to produce a lot more fine detail. For example, in FIG. 21, two circles 901 and 902 are shown with respective regions 903 and 904 that are not grid-aligned. These circles are overlapped yielding difference regions 905 and 907, and intersection region 906. In FIG. 22, the same circles 901 and 902 have regions 913 and 914 that are aligned to grid 910. These circles are overlapped yielding difference regions 915 and 917 and intersection region 916. It can be seen in this example that the grid-aligned regions yield less detailed results at the expense of slightly less efficient region coverage. Regions 905, 906 and 907 together contain a total of sixty segments, while regions 915, 916 and 917 together contain only fifty-two.

2.3.2 Creating Binary Region Groups

The region groups of binary nodes in the compositing tree on the other hand are the result of combining the region groups of their child nodes. It will now be explained how region groups are combined to form new region groups. In this section, for simplicity only "OVER" and "IN" binary nodes will be dealt with. The operations required for binary nodes representing other compositing operators can easily be inferred from combining the "OVER" and "IN" cases in various ways.

For the sake of clarity, the method of the preferred embodiments is initially described without reference to optimization based properties such as opacity.

The following notation will be beneficial when considering binary region group creation:

| Notation | |
|---|---|
| RG1 | The region group of the binary node's left child |
| RG2 | The region group of the binary node's right child |
| RG | The region group of the binary node. It is this region group that is being initialised |
| RG1→urgn | The region description representing the union of all RG1's region descriptions (RG1's coverage region). |
| RG2→urgn | The region description representing the union of all RG2's region descriptions (RG2's coverage region). |
| RG→urgn | The union of all RG's region descriptions (to be initialised) (RG's coverage region) |
| rg1i | The current region in RG1 |
| rg2j | The current region in RG2 |
| rg1i→rgn | rg1i's region description |
| rg2j→rgn | rg2j's region description |
| rg1i→proxy | rg1i's proxy |
| rg2j→proxy | rg2j's proxy |

2.3.2.1 Constructing "OVER" Region Groups

When constructing "OVER" region groups, only areas where the contributing region groups intersect need to be composited. Areas where one operand does not overlap the other involve no compositing. The method is broken into three iterative steps. First, the coverage region of the region group of the binary node that is being initialised (RG→urgn) is made equal to the union of the coverage regions of the binary nodes left child (RG1→urgn) and the binary node's right child (RG2→urgn). Then, for each region $rg_i$ in RG1, the difference (diff_rgn) between that region and RG2's coverage region (RG2→urgn) is then calculated. If the difference (diff_rgn) is non-empty then a new region with diff_rgn as its region description is added to RG. The proxy of this new difference region can be the same as the proxy of $rg1_i$. No compositing is required to generate it. The difference regions between RG2's regions and RG1's coverage region are similarly constructed and added to RG. Finally, the intersection (inter_rgn) between each region $rg1_i$ in RG1 and each region $rg2_j$ in RG2 is calculated. If the result of this intersection is non-empty, then a new proxy (new_p) is created by compositing $rg1_i$'s proxy with $rg2_j$'s proxy using the over operation with the inter_rgn. A new region is then added to RG with inter_rgn as its region description and new_p as its proxy. The method of constructing "OVER" region groups in accordance with the preferred embodiment is described below using pseudo-code.

```
RG→urgn = RG1→urgn union RG2→urgn
FOR i = 0 TO number of regions in RG1 DO
    diff_rgn = rg1i→rgn difference RG2→urgn
    IF diff_rgn is non-empty THEN
        ADD to RG a new region with diff_rgn as its region
            description and
        rg1i→proxy as its proxy.(*)
    END IF
    FOR j = 0 TO number of regions in RG2 DO
        inter_rgn = rg1i→rgn intersection rg2j→rgn
        IF inter_rgn is non-empty THEN
            create new proxy new_p initialised to OVER of rg1i→
                proxy and
            rg2j→proxy inside inter_rgn.
                ADD to RG a new region with inter_rgn as its region
                    description
        and new_p as its proxy.(+)
            END IF
    END DO
END DO
FOR j = 0 TO number of regions in RG2 DO
    diff_rgn = rg2j→rgn difference RG1→urgn
    IF diff_rgn is non-empty THEN
        ADD to RG a new region with diff_rgn as its region
            description and
        rg2j→proxy as its proxy.(*)
    END IF
END DO
```

The regions added by the ADD operations marked with asterisks (*) above are termed difference regions since their shape is the result of a difference operation. Such regions are very cheap computationally because their proxies require no compositing. The only work involved is the administrative overhead of adding a new region to the region group and the cost of the difference operation itself. In the preferred embodiment, a proxy is inherited from the region (in one of the child region groups) on which it is based. It can be seen that proxies which originate low in the compositing tree can be propagated upwards towards the root with minimal overhead (both in terms of speed and memory) by the use of difference regions.

The regions added by the ADD operation marked with the plus (+) are termed intersection regions. This is because their shape is the result of an intersection operation. The proxies of such regions are more expensive to generate than difference regions because they involve per-pixel compositing operations to be done within the area defined by the intersection. The more fidelity granted the region descriptions, the greater the saving in pixel processing costs, at the cost of a greater administrative overhead (more complex regions require longer to intersect etc).

Figure 8:
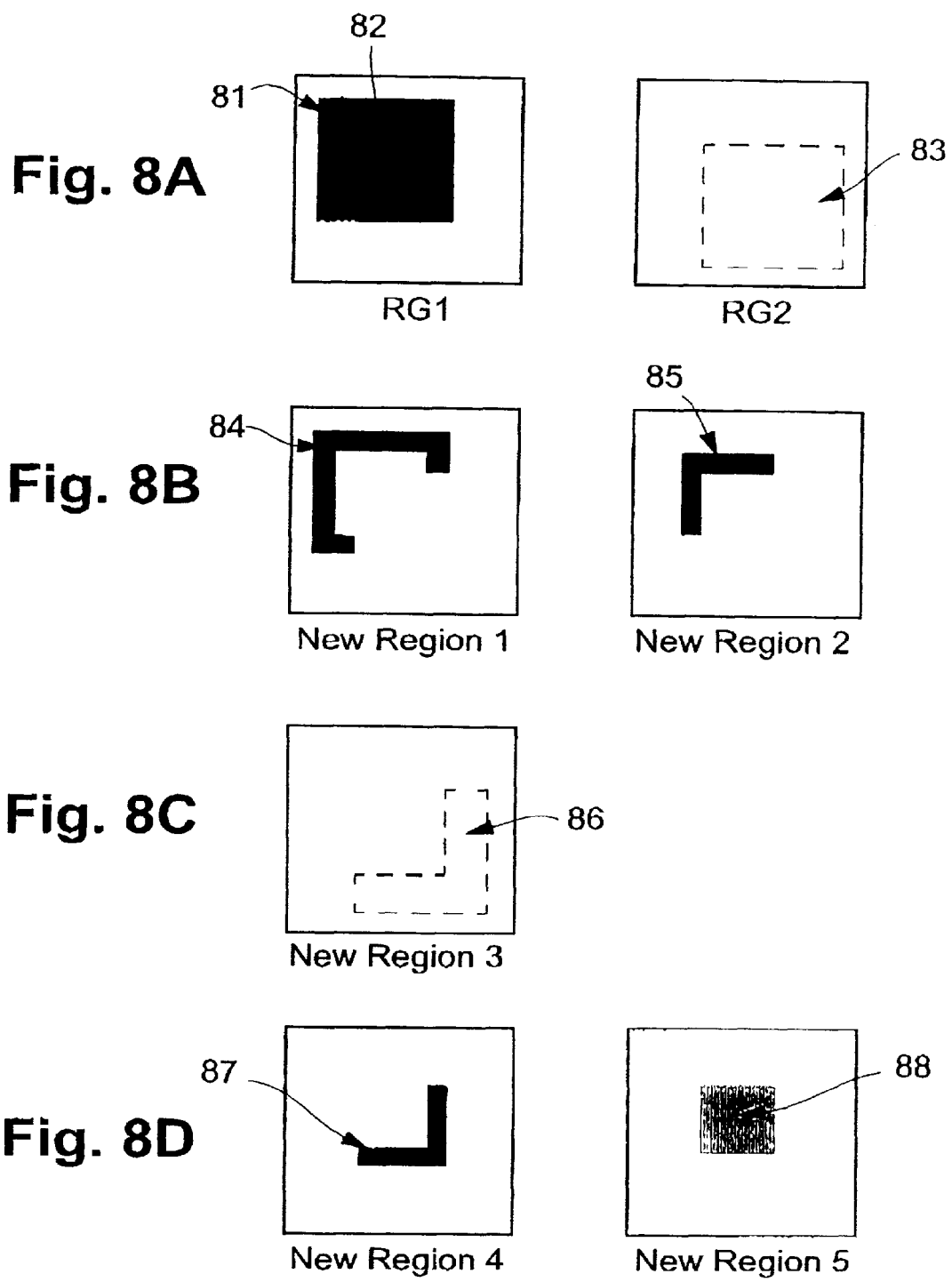
FIGS. 8A to 8D illustrate the steps involved in combining two region groups using the Over operation according to the present invention.

FIGS. 8A to 8D provide a simple example of combining "OVER" region groups using the above method. The region group resulting from the combination contains 5 regions, 3 difference regions and 2 are intersection regions. FIG. 8A represents two region groups RG1 and RG2 which are to be combined. RG1 contains two regions 81 and 82, whereas RG2 only contains a single region 83. As seen in FIG. 8B, for each region in RG1, RG2's region coverage is subtracted from the corresponding region in RG1. If the resultant region is non-empty, the resultant region becomes a region in the new region group. In this example both regions 81 and 83 produce non-empty difference regions 84 and 85 respectively. For each region in RG2, RG1's region coverage is subtracted from it, as seen in FIG. 8C. In this example difference region 86 is produced. Finally, every region in RG1 is intersected with every region in RG2, as seen in FIG. 8D. Any non-empty region becomes a region in the new region group. In this example, regions 81 and 83 produce 87. Further, regions 82 and 83 produce 88.

2.3.2.2 Constructing "IN" Region Groups

The properties of the "IN" operator lead to the fact that an "IN" binary region group only produces pixel data in the region of intersection between the two contributing region groups. Essentially, when compared to the algorithm used for "OVER" region groups, only intersection regions are generated. Therefore, for each region $rg1_i$ of RG1, and for each region $rg2_j$ of RG2 the intersection (inter_$rgn_{ij}$) between $rg1_i$ and $rg2_j$ is calculated. If the intersection is non-empty then a new proxy (new_p) is created by compositing $rg1_i$'s proxy with $rg2_j$'s proxy using the "in" operation within inter_$rgn_{ij}$. A new region is then added to RG with inter_rgn as its region description and new_p as its proxy. The pseudocode for the method of constructing "IN" region groups according to the preferred embodiment is provided below:

```
RG→urgn = RG1→urgn intersection RG2→urgn
FOR i = 0 TO number of regions in RG1 DO
    FOR j = 0 TO number of regions in RG2 DO
        inter_rgn = rg1ᵢ→rgn intersection rg2ⱼ→rgn
        IF inter_rgn is non-empty THEN
            create new proxy new_p initialised to IN of rg1ᵢ→proxy
            and
rg2ⱼ→proxy inside inter_rgn.
            ADD to RG a new region with inter_rgn as its region
            description
and new_p as its proxy.(+)
        END IF
    END DO
END DO
```

The major difference between the "IN and the "OVER" cases is that the "OVER" case generates difference regions while "IN" does not. In the example demonstrated by FIGS. 8A to 8D, only new regions 87 and 88 would be generated, as these are intersection regions. Difference regions 84, 85 and 86 would not be generated using "IN".

Using Table 2 below and the pseudocode examples of "OVER" and "IN", the relevant code for other compositing operators can be derived.

2.3.2.3 Constructing Region Groups of Other Compositing Operators

Other compositing operators typically generate the same intersection regions as the "OVER" and "IN" cases do. However, they typically differ from one another (as indeed from "OVER" and "IN") in what difference regions they generate. This is dependent on the particular properties of each compositing operator. Table 2 summarises which difference regions are generated for some commonly used compositing operators.

TABLE 2

| Compositing Operator | Generate Diff Rgns from RG1 ? | Generate Diff Rgns from RG2 ? |
| --- | --- | --- |
| Over | Yes | Yes |
| In | No | No |
| Out | Yes | No |
| Atop | No | Yes |
| Xor | Yes | Yes |
| Plus | Yes | Yes |

2.4 Optimising Using Opaque Areas

The preferred embodiments stores within each region a flag indicating whether the pixel data in the region proxy is completely opaque. It is therefore possible to reduce the number of per-pixel compositing operations by exploiting the effect opaque operands have on the compositing operators.

2.4.1 Opaque Area Optimisation for "Over" Region Groups

If an opaque region is "OVER" another region, then there is no need to compute the result of the composite, as no part of the right operand region's proxy is visible through the left operand's opaque proxy. In the preferred embodiment, the resultant region is made to reference the right operand's proxy, which has the same effect as actually doing the composite.

The method of opaque area optimisation for "OVER" region groups is a slightly modified version of the "OVER" region group construction method provided previously. The only difference is that when calculating the intersection region of the current region in RG1 and each region of RG2, a check is carried out to see whether the current region in RG1 is opaque. If this is the case, then the proxy of the newly calculated region (new_p) will be the proxy of the current region in RG1.

The method is illustrated using the following pseudocode:

```
RG→urgn = RG1→urgn union RG2→urgn
FOR i = 0 TO number of regions in RG1 DO
    diff_rgn = rg1ᵢ→rgn difference RG2→urgn
    IF diff_rgn is non-empty THEN
        ADD to RG a new region with diff_rgn as its region
        description and
rg1ᵢ→proxy as its proxy.(*)
    END IF
    FOR j = 0 TO number of regions in RG2 DO
        inter_rgn = rg1ᵢ→rgn intersection rg2ⱼ→rgn
        IF inter_rgn is non-empty THEN
            IF rg1ᵢ is OPAQUE THEN
                new_p = rg1ᵢ→proxy
            ELSE
                create new proxy new_p initialised to OVER of
                rg1ᵢ→proxy
and rg2ⱼ→proxy inside inter_rgn.
            END IF
            ADD to RG a new region with inter_rgn as its region
            description
and new_p as its proxy.(+)
        END IF
    END DO
END DO
FOR j = 0 TO number of regions in RG2 DO
    diff_rgn = rg2ⱼ→rgn difference RG1→urgn
    IF diff_rgn is non-empty THEN
        ADD to RG a new region with diff_rgn as its region
        description and
rg2ⱼ→proxy as its proxy.(*)
    END IF
END DO
```

2.4.2 Opaque Area Optimisation for "IN" Region Groups

If a region is "IN" an opaque region, then according to the properties of the "IN" operator, the resultant pixel data is the same as that of the left operand. This can be achieved by having the resultant region simply reference the proxy of the left operand. The method of the preferred embodiments is a slightly modified version of the "IN" region group construction method provided previously. The only difference is that when calculating the intersection region of the current region in RG1 and each region of RG2, a check is carried out to see whether the current region in RG2 is opaque. If this is the case, then the proxy of the newly calculated region (new_p) will be the proxy of the current region in RG1.

The technique is illustrated using the following pseudocode:

```
RG→urgn = RG1→urgn intersection RG2→urgn
FOR i = 0 TO number of regions in RG1 DO
    FOR j = 0 TO number of regions in RG2 DO
        inter_rgn = rg1_i→rgn intersection rg2_j→rgn
        IF inter_rgn is non-empty THEN
            IF rg2_j is OPAQUE THEN
                new_p = rg1_i→proxy
            ELSE
                create new proxy new_p initialised to IN of rg1_i→
                    proxy and
rg2_j→proxy inside inter_rgn.
            END IF
            ADD to RG a new region with inter_rgn as its region
                description
and new_p as its proxy.(+)
        END IF
    END DO
END DO
```

2.5 Initialising the Entire Tree

The entire compositing tree can be initialised by using the above-described method of the preferred embodiments on every binary region group in the tree. A node cannot be initialised until its children have been initialised. Therefore the process simply starts at the bottom of the tree and works its way up towards the root. The process first checks to see if the current node is a leaf node. If this is the case, then a leaf node region group is constructed. However, in the case that the current node is a binary node then a binary node region group is constructed using the method of the preferred embodiments outlined in sections 2.4.1 and 2.4.2. The following pseudocode outlines a method for initialising all the region groups of the tree. The method utilises a recursive function, which is called passing the root of the tree as an argument.

```
tree_init(node : tree ptr)
BEGIN
    IF node is a leaf node THEN
        CONSTRUCT leaf node region group
    ELSE
        tree_init(node→left)
        tree_init(node→right)
        CONSTRUCT binary node region group by combining region
            groups of
the left and right children
    END IF
END tree_init
```

2.6 Constructing the Resultant Image

Once the compositing tree has been initialised, the region group at the root of the tree contains a group of zero or more regions which together represent the partitioning of the resultant image into areas which differ in the way the image data was generated. Some of the regions' proxies can refer to image data directly from leaf nodes of the tree, having not required any compositing. Other regions, on the other hand, may have proxies which are the result of compositing operations. If a single resultant image is required, such as an image stored in a pixel buffer, this can be achieved by copying the image data from each region's proxy to the pixel buffer within the area corresponding to the region. The process is demonstrated in the pseudocode provided below, which is generalised and able to restrict the construction of the final image to any nominated update region.

```
construct_image
(
    output_image : pixel data ptr,
    urgn : region description
)
BEGIN
    FOR i = 0 TO number of region in RG DO
        int_rgn = rg_i→rgn intersection urgn
        IF int_rgn is non-empty THEN
            COPY image data from rg_i→proxy to output_image
                inside int_rgn
        END IF
    END DO
END construct_image
```

3.0 Dynamic Rendering

Dynamic Rendering refers to the problem of generating multiple successive images. Given a compositing tree, it is possible to generate it's region groups (containing regions and proxies) using the method described above. A further embodiment to the above-mentioned method, which supports dynamic rendering is described below. The compositing tree represents an image. Changes to the tree can be made to make the tree represent a new image. The tree's region groups (and tree region description and proxies) are updated to reflect the modified tree. Performance is improved by exploiting commonality between the two images. An example will illustrate the techniques and terminology of the further embodiment.

FIG. 3 shows the region subdivision and the respective compositing expressions (advantage is not taken of opacity) for the simple compositing tree. Consider therefore the situation in which object A moves by a small amount relative to the other objects. Some regions in the region group at the root of the tree will be affected by A moving.

If opaque case optimisations are ignored, the regions with compositing expressions which include A will be significantly affected by A moving. The region numbers which are so affected are 2, 3, 5 and 6. When updating the region group at the root of the tree, those regions will need both their region descriptions and their proxies completely recalculated. This situation is known in the further embodiment as primary damage. Any region whose compositing equation includes an object which has changed in some way, may be said to suffer primary damage.

Regions that abut regions which have A in their compositing expression are also effected by A moving, though not as severely as those regions with primary damage. In the example, these other affected regions are 1, 4, 7 and 8. When updating the region group at the root of the tree, these regions will need their region descriptions recalculated. However, their proxies will only need to be recalculated in areas of the new region which were not included in the corresponding earlier region. This situation is known in the further embodiment as secondary damage. Generally, secondary damage is incurred if an object upon which a region's boundary (but not content) depends, changes in some way.

In order to reduce the per-frame update cost, it is important to reduce, as far as is practicable, the amount of work necessary, both in terms of per-pixel operations, but also in terms of region group operations. The concepts of primary and secondary damage are a way of facilitating this. If the further embodiment is able to accurately determine the minimum set of regions throughout all the compositing tree which have some kind of damage, then obviously the amount of work being done is reduced.

Figure 24:
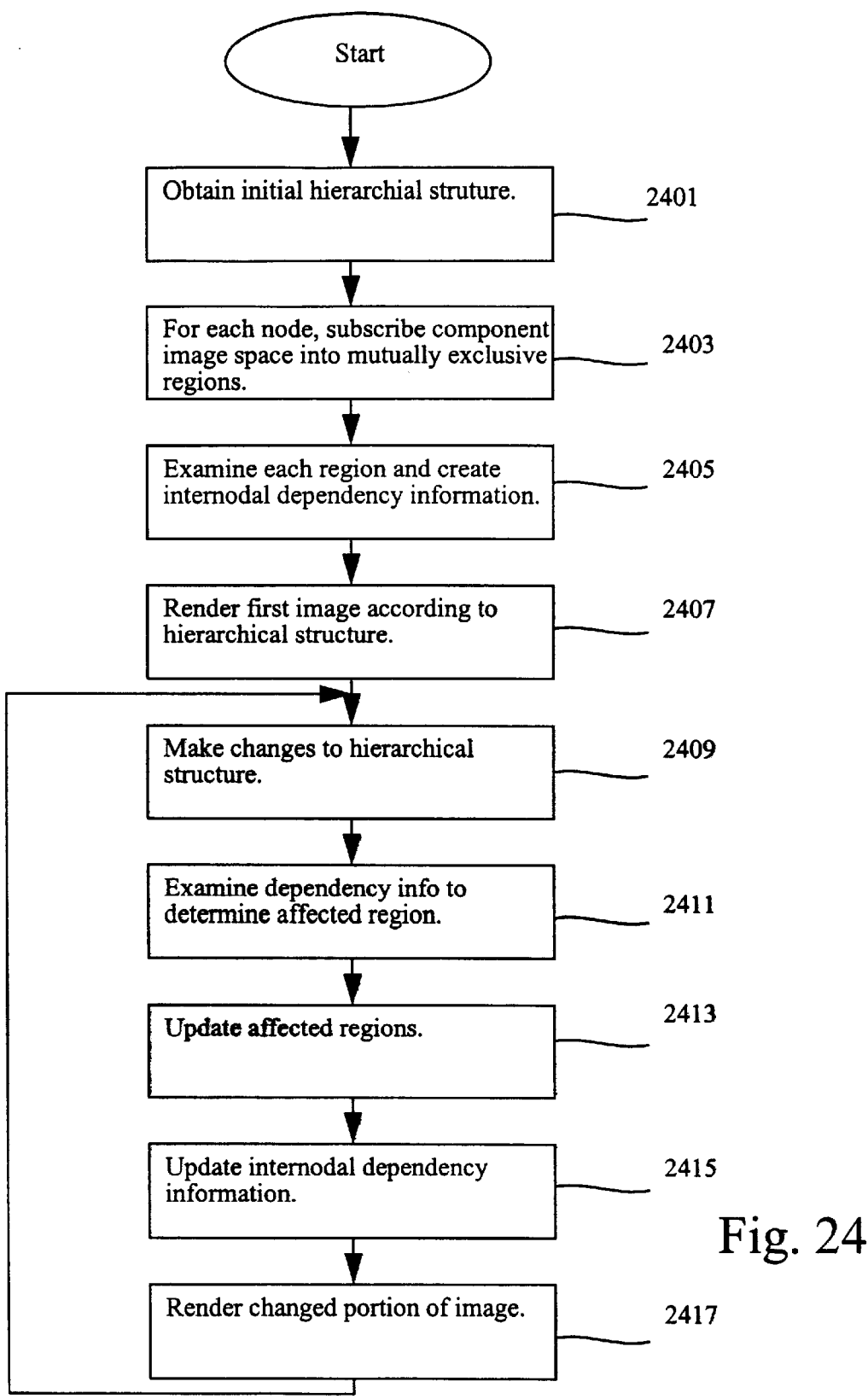
FIG. 24 is a flowchart showing a method of creating a series of images in accordance with the further embodiment of the present invention; and Appendix 1 is a listing of source code according to the present invention

FIG. 24 is a flowchart showing a method of creating a series of images in accordance with a further embodiment of the present invention. Each member of the series of images is related to a preceding member. The images are formed by rendering a number of graphical objects to be composited according to a hierarchical compositing tree representing a compositing expression. Each node of the hierarchical compositing tree represents a component of at least one of the images and each of the objects has a predetermined outline. The process begins at step 2401, where a hierarchical compositing tree representing a first image is accessed. At the next step 2403, for each node of hierarchical compositing tree, the component image space is subdivided into a number of mutually exclusive regions. The process continues at step 2405, where each of the mutually exclusive regions is examined and internodal dependency information is created. The data structure of the internodal dependency information and the process for creating it are described in sections 3.1 to 3.9 below. At the next step 2407, the first image is rendered according to the hierarchical structure. The process continues at step 2409, where the image changes resulting in changes to the hierarchical compositing tree. At the next step 2411, the dependency information is examined to determine which regions have been affected by the changes to the hierarchical compositing tree. The process continues at the next step 2413, where affected regions are updated. At the next step 2415, the internodal dependency information is updated to reflect the changes to the hierarchical compositing tree. The process of examining and updating the regions is described in sections 3.6 to 3.9, below. In particular, section 3.9 includes a pseudocoding listing which illustrates a method for updating a binary "OVER" region. The process continues at step 2417, where the changed portions of the first image are rendered according to the hierarchical compositing tree to produce the updated image. Only those regions affected by the change are rendered at step 2417.

3.1 Basic Data Model

The data model used for static rendering, consisting as it does of a region description and a proxy, is insufficient for use in dynamic rendering. This is because, for primary and secondary damage to be determined, it must be possible to associate regions of the same content between frames. To support the association of regions of the same content, some extra information is required in each region in a region group. Therefore, each region in a region group now contains the following data:

(i) A Region Description: A low-level representation of the boundaries of the region. The region descriptions of all the regions in a region group must be mutually exclusive (non-intersecting, non-overlapping).
  (ii) A Proxy: Some means of caching the pixel data resulting from applying the operation specified by the compositing expression at every pixel inside the region description. A proxy can be as simple as a 24-bit colour bit-map, or something much more complicated (such as a run-length encoded description). Fundamentally, a proxy simply has to represent pixel data in some way which makes it efficient to retrieve and use.
  (iii) A Contents Label: A contents label represents a unique symbolic expression that describes the method of construction of image data. The terms in the symbolic expression distinguish between different categorisations of a source of image data. Therefore, the region groups of two distinct leaf nodes in the compositing tree will contain regions which are labelled with distinct contents labels even if their actual image data is equivalent. The further embodiment uses a system of unique integers to represent contents labels. For example "23" could represent "(A over B) over C".
  (iv) A Flag Register: A general-purpose flag register used to store state during the region group update process. The exact flags stored here will be outlined in a later section.

3.2 Contents Labels

Leaf node region groups can contain multiple regions, with each region naturally having a unique contents label. For example, the region group of a leaf node in a compositing tree could contain a single region (tagged with a single contents label) representing the non-transparent area of the leaf node. Alternatively, the leaf node region group could contain two regions (each tagged with a different contents label), one representing the area of the leaf node which is completely opaque, the other representing the remaining non-transparent area. A leaf node can also be categorised even further, into an arbitrary number of regions (and associated contents labels).

One way a contents label can be created is by assigning a new one to a region of a leaf node region group. Another way is taking other contents labels and combining them to create a new contents label that represents the symbolic expression that represents the combination of the contributing expressions. For example, if the contents label representing ((A comp B) comp C) is combined with the contents label representing (D comp E) then a new contents label will be created which represents (((A comp B) comp C) comp (D comp E)).

As well as contents labels, dependency information is also required. Dependency information indicates how a given contents label is related to other contents labels, both in terms of how the contents of one region contribute to contents of other regions, and how change of a region boundary affect the boundary of other regions. The further embodiment associates the following data with each contents label.

(i) Primary Dependency List: Each primary dependency is a contents label L' to which a contents label L directly contributes. In other words, a "primary dependency" is a contents label L' representing an expression which has been constructed by combining L and some other contents label. Each time contents labels are combined, the contents label for the combination is added to the primary dependencies of all contributors.
  (ii) Secondary Dependency List: Each secondary dependency is a contents label L" which can be indirectly affected if the image represented by the contents label L has changed in some way that affects it's boundary. Whenever contents labels are combined, a contributing contents label is added to the secondary steps of the continuation if and only if the compositing operator yields a difference region with said contributing contents label. Table 2 shows which of some commonly used operators yield difference regions for their left and right operands. In addition, for a combination of (A comp B), the secondary dependencies of the combination contents labels for all (A comp $b_i$) and all ($a_j$ comp B) are added, where $a_j$ are the secondary dependencies of A and $b_i$ are the secondary dependencies of B.

(iii) Property Information: Each contents label can represent contents which have properties which the compositing engine may be able to exploit. An example is that of opaqueness. If a contents label represents opaque content, then compositing that content could be much faster, as for certain operators, no per-pixel compositing operations would be required.

3.3 Contents Label Implementation

The further embodiment uses unique integers as contents labels, and stores a number representing the number of contents labels which currently exist. When a new contents label is created, the number is incremented and becomes the unique integer representing the contents label. This technique of assigning a contents label by monotonically incrementing an integer means that the contents labels' associated data structures can be stored in a one dimensional array which grows as more contents labels are added. A content label's data structure can be referenced simply by using the contents label as an index. When a leaf node contents label is created, the contents label is initialised to have no primary or secondary dependencies. If the current leaf node contents label is opaque, then a flag is set in content label i's properties.

The pseudocode below illustrates the basic techniques used to create a new contents label which is not dependent on other contents labels (ie: a leaf node region group contents label):

| Notation | |
|---|---|
| opaque | A flag passed to the function which indicates whether or not the contents label represents opaque content or not. |
| cur_clab | A global integer which stores the last contents label created. |
| clabs | A global array which stores the associated data structures of the contents label. |
| clabs[i]->pri_deps | A pointer to the head of content label i's primary dependency list. |
| clabs[i]->sec_deps | A pointer to the head of content label i's secondary dependency list. |
| clabs[i]->properties | A flag register representing contents label i's properties. |

```
create_new_contents_label
(
    opaque : boolean
): RETURNS unsigned int
BEGIN
    INCREMENT cur_clab.
    clabs[cur_clab]->pri_deps = NULL.
    clabs[cur_clab]->sec_deps = NULL.
    IF opaque THEN
        clabs[cur_clab]->properties = OPAQUE.
    ELSE
        clabs[cur_clab]->properties = 0.
    END IF
    RETURN cur_clab.
END create_new_contents_label.
```

Contents labels can also be created to represent the combination of existing contents labels. This is achieved in the further embodiment by a hash table which maps an operation and the contents labels of its operands (hashed together to create a key) to a single contents label representing the result.

When a region is created which represents an intersection between two other regions (each with its own contents label), a new contents label is generated which is used to tag the new region. When this new contents label is generated, it must be added to the primary dependency lists of both its contributing operands. A secondary dependency list which depends on the secondary dependencies of the two contributing contents labels as well as the properties of the compositing operator must also be generated.

The process is recursive and begins by adding the newly created contents label (new_cl) to the primary dependency lists of the contributing contents labels. Then, depending on the properties of the compositing operator, none, either or both of the contributing contents labels are added to the secondary dependency list. Then every contents label representing (clab1 op $sd2_i$) and ($sd1_i$ op tab2) are added to the secondary dependency list.

| Notation | |
|---|---|
| clab1 | The first contributing contents label. |
| clab2 | The second contributing contents label. |
| sd1i | The i'th element of clab1's secondary dependency list. |
| sd2i | The i'th element of clab2's secondary dependency list. |

```
create_binary_contents_label
(
    clab1 : contents label,
    clab2 : contents label,
    op: compositing operator
)
BEGIN
    IF the hash table already contains an entry representing clab1 op clab2
    THEN
        RETURN the existing contents label representing the combination.
    END IF
    Generate a new entry in the hash table representing clab1 op clab2, map-
ping to new_cl.
    (Add the new contents label to the primary dependency lists of the contribut-
ing contents labels if the compositing op requires it)
    add_to_primary_dep_list(clab1, new_cl)
    add_to_primary_dep_list(clab2, new_cl)
    (Generate the secondary dependencies)
    IF op generates left diff rgns THEN
        add clab1 to secondary deps
    END IF
    IF op generates right diff rgns THEN
        add clab2 to secondary deps
    END IF
    FOR i = 0 TO number of elements in sd1 DO
        add_to_secondary_dep_list
        (
            new_cl,
            create_binary_contents_label(sd1_i, clab2)
        )
    END DO
    FOR i = 0 TO number of elements in sd2 DO
        add_to_secondary_dep_list
        (
            new_cl,
            create_binary_contents_label(clab1, sd2_i)
        )
    END DO
END constuct_binary_contents_label
```

3.4 Combining Region Groups for Dynamic Rendering

Before any incremental updates can be made to a compositing tree, the compositing tree must be constructed to be in a consistent initial state. The basic technique for achieving this is the same as that used for static rendering, except that support for contents labels is included.

Leaf node region groups are initialised essentially as with static rendering, except that each region in each leaf node region group is tagged with a unique contents label. Each contents label can in turn be tagged with various categorisation properties which may help the renderer to be more efficient. For example, a contents label can be tagged as being completely opaque.

The initialisation of binary nodes is also similar to the static rendering case. By way of example, the way in which the region group for an "OVER" binary node is constructed will now be explained. The techniques for constructing the region groups of the other compositing operators can easily be inferred from the "OVER" case.

When a difference region between $rg_i$ of one operand and the coverage region of the other operand is calculated, the difference region inherits the contents label $rg_i$. When an intersection region is created, on the other hand, a new contents label is created by combining the contents labels of the two contributing regions since the two contributing regions had their proxies composited into a new proxy which means new content. The pseudocode for constructing an "OVER" region group which includes contents label management is provided below:

| Notation | |
|---|---|
| RG1 | The region group of the binary node's left child |
| RG2 | The region group of the binary node's right child |
| RG | The region group of the binary node. It is this region group that we are initialising |
| RG1→urgn | The region description representing the union of all RG1's region descriptions (RG1's coverage region). |
| RG1→urgn | The region description representing the union of all RG2's region descriptions (RG2's coverage region). |
| RG→urgn | The union of all RG's region descriptions. |
| rg1i | The current region in RG1 |
| rg2j | The current region in RG2 |
| rg1i→rgn | rg1i's region description |
| rg2j→rgn | rg2j's region description |
| rg1i→proxy | rg1i's proxy |
| rg2j→proxy | rg2j's proxy |

RG→urgn = RG1→urgn union RG2→urgn
FOR i = 0 TO number of regions in RG1 DO
    diff_rgn = rg1i→rgn difference RG2→urgn
    IF diff_rgn is non-empty THEN
        ADD to RG a new region with diff_rgn as its region description,
rg1i→proxy as its proxy and rg1i→clab as its contents label.
    END IF
    FOR j = 0 TO number of regions in RG2 DO
        inter_rgn = rg1i→rgn intersection rg2j→rgn
        IF inter_rgn is non-empty THEN
            new_clab = GENERATE a new unique contents label as a result
of combining rg1i→clab and rg2j→clab.
            IF rg1i→clab is OPAQUE THEN
                new_p = rg1i→proxy
            ELSE
                create new proxy new_p initialised to OVER of rg1i→proxy
and rg2j→proxy inside inter_rgn.
            END IF
            ADD to RG a new region with inter_rgn as its region description,

| -continued | |
|---|---|
| Notation | | new_p as its proxy and new_clab as its contents label.
            END IF
    END DO
END DO
FOR j = 0 TO number of regions in RG2 DO
    diff_rgn = rg2j→rgn difference RG1→urgn
    IF diff_rgn is non-empty THEN
        ADD to RG a new region with diff_rgn as its region description,
rg2j→proxy as its proxy and rg2j→clab as its contents label.
    END IF
END DO

3.5 Secondary Dependencies and Over

The rationale behind the method used for generating secondary dependencies requires more explanation. Secondary dependencies are only generated when a new contents label is created by combining two other contents labels. As can be seen in the above pseudocode, this only occurs when an intersection region is generated. Essentially, the further embodiment uses contents labels generated for intersection regions as triggers—the regions tagged with two contents labels cannot indirectly affect one another unless they intersect. The secondary dependency list for a particular contents label is dependent on the compositing operator the composite contents label represents, the two contributing contents labels and their secondary dependency lists.

The method of the further embodiment of generating a secondary dependency list for a new contents label (C) which represents one contents label (A) composited over another contents label (B) using the "OVER" operator will now be explained. Elements of A's and B's secondary dependency lists are referred to as $A_i$ and $B_i$ respectively. First, both A and B are added to C's secondary dependency list. This is because if the region tagged with C changes its boundary, then it is likely that any regions tagged with A and B will need to be recalculated (because their regions are likely to abut C's region). Next, for each element of B's secondary dependency list, each contents labels representing (A OVER $B_i$) is added. A mapping representing A OVER $B_i$ can not currently exist in the system and needs to be created. A secondary dependency list can contain contents labels which are not represented by any region in a region group. They could come into existence by changes in region boundaries. The rationale is that A intersects B, and therefore it is likely that A also intersects regions tagged with contents labels which exist in B's secondary dependency list. Similarly, for each element of A's secondary dependency list, each contents label representing ($A_i$ OVER B) is added.

3.6 Contents Labels and Damage

The concepts of primary and secondary damage were introduced with reference to FIG. 3 to demonstrate that it is not always necessary to regenerate an entire image as a result of a change to the compositing tree. By keeping track of dependencies between regions of different content, it only becomes necessary to regenerate image data in regions whose contents have become damaged. The following explanation outlines the dependencies and damage for simple compositing tree changes. "Simple" means that only leaf nodes are modified. More complex change scenarios such as tree structure changes etc will be outlined in later sections.

If a leaf node is modified, the contents labels of its affected regions are said to be "primary damaged". Primary-damaging a contents label involves recursively primary-damaging all its primary dependencies. Whenever a contents label is primary-damaged, all its secondary dependencies are non-recursively marked with secondary damage. The process begins by flagging the contents label to be damaged. The following pseudocode demonstrates how contents labels can be damaged:

| | Notation |
|---|---|
| clab | The contents label to be damaged |
| pdi | The i'th element of clab's primary dependency list. |
| sdi | The i'th element of clab's secondary dependency list. |

```
damage_contents_label
(
    clab : contents label,
)
BEGIN
    FLAG clab with PRIMARY damage
    FOR i = 0 TO number of elements in sd DO
        FLAG sd_i with SECONDARY damage
    END DO
    FOR i = 0 TO number of elements in pd DO
        damage_contents_label(pd_i)
    END DO
END damage_contents_label
```

When a tree update occurs, any region with its contents label marked as having primary damage will need to recalculate both its region boundaries and its proxy. Any region with its contents label marked as having secondary damage will need to recalculate its region description but will only need to recalculate its proxy in areas of the new region that were not included in the earlier region.

3.7 Examples of Contents Labels and Dependencies

In order to clarify the concepts of contents labels and damage, some examples of varying complexity will be presented.

3.7.1 Example 1

Figure 9:
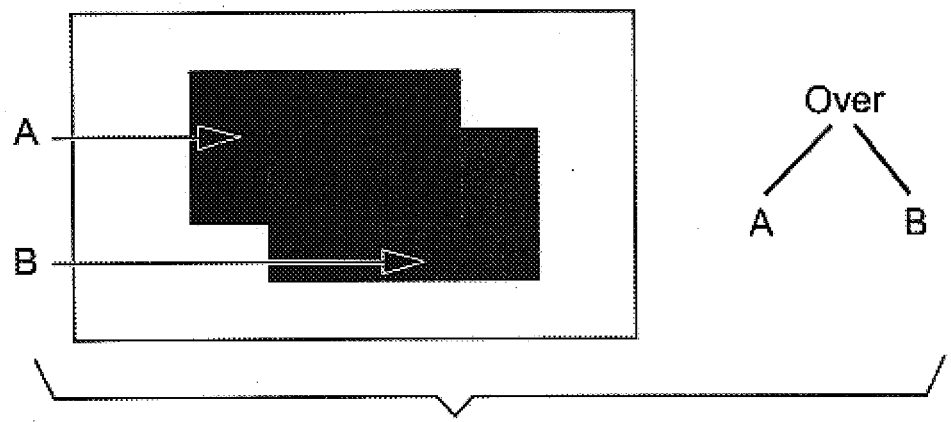
FIG. 9 illustrates an image and compositing tree according to an example of a further embodiment of the present invention.

FIG. 9 will result in the following contents label table after the compositing tree is initially constructed (Note: in the following table contents labels are represented as unique strings not as integers where "over" has been abbreviated to "o". This is simply for readability):

| Contents Label | Primary Deps. | Secondary Deps. |
|---|---|---|
| A | AoB | |
| B | AoB | |
| AoB | | A, B |

If A moves, then AoB will have primary damage, resulting in B having secondary damage.

3.7.2 Example 2

Figure 10:
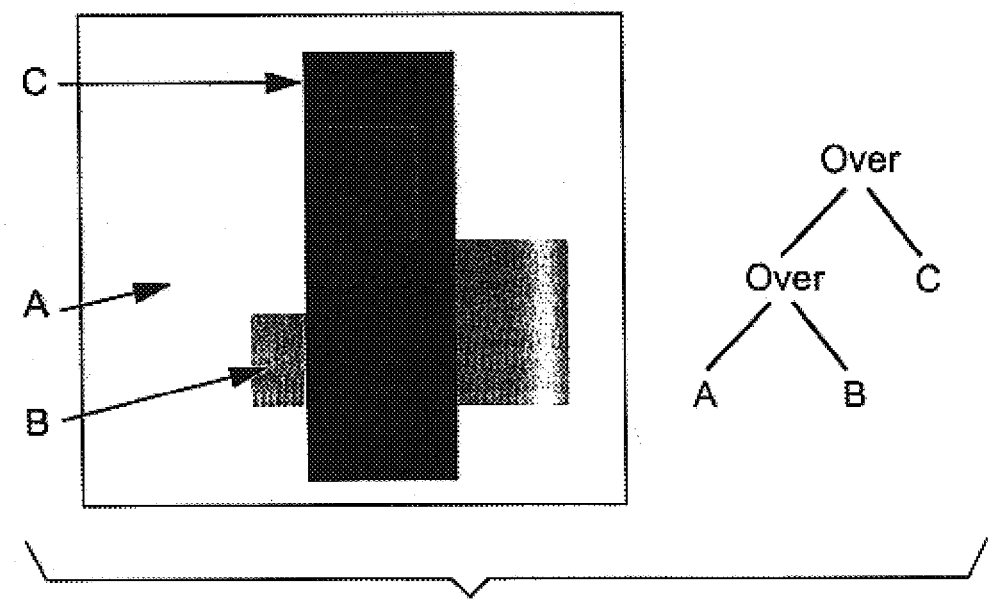
FIG. 10 illustrates an image and compositing tree according to another example of the further embodiment.

FIG. 10 will result in the following contents label table after the compositing tree is initially constructed:

| Contents Label | Primary Deps. | Secondary Deps. |
|---|---|---|
| A | AoB, AoC | |
| B | AoB, BoC | |
| AoB | AoBoC | A, B |
| C | AoC, BoC, (AoB)oC | |

-continued

| Contents Label | Primary Deps. | Secondary Deps. |
|---|---|---|
| AoC | | A, C |
| BoC | | B, C |
| (AoB)oC | | AoB, C, AoC, BoC |

In this example, every object intersects every other object, so if something changes, everything will be damaged in some way—everything which is a primary dependency of the changed object will have primary damage, whereas everything else will have secondary damage.

Figure 11:
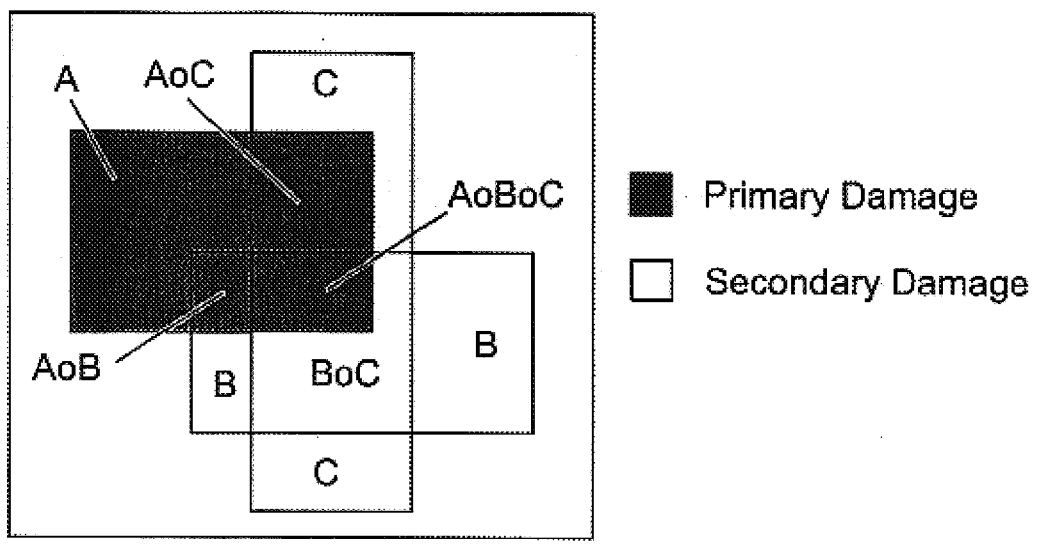
FIG. 11 illustrates the effect on the image of FIG. 10 of moving region A.

FIG. 11 illustrates the effect of A moving in a subsequent frame. As can be seen, if A is damaged, the regions defined by A, AoB, AoC and (AoB)oC will each have primary damage. The regions defined by B, C and BoC will each have secondary damage.

3.7.3 Example 3

Figure 12:
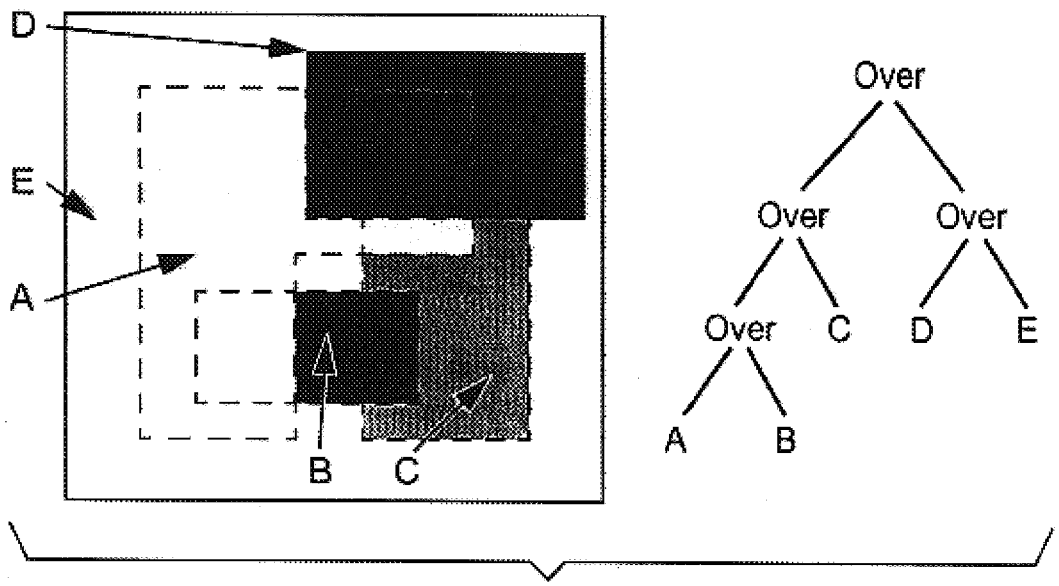
FIG. 12 illustrates an image and compositing tree according to still another example of the further embodiment.

FIG. 12 will result in the following contents label table after the compositing tree is initially constructed:

| Contents Label | Primary Deps. | Secondary Deps. |
|---|---|---|
| A | AoB, AoC, AoE, Ao(DoE), AoD | |
| B | AoB, BoC, BoE | |
| AoB | AoBoE | A, B |
| D | DoE, AoD, CoD, (AoC)oD | |
| E | DoE, AoE, (AoB)oE, BoE, CoE, (BoC)oE, (AoC)oE | |
| DoE | Ao(DoE), (AoC)o(DoE), Co(DoE) | D, E |
| C | AoC, BoC, Co(DoE), CoE, CoD | |
| AoC | AoCoE, (AoC)o(DoE), (AoC)oD | A, C |
| BoC | (BoC)oE | B, C |
| AoE | | A, E |
| (AoB)oE | | AoB, E, AoE, BoE |
| BoE | | B, E |
| CoE | | C, E |
| (BoC)oE | | BoC, E, BoE, CoE |
| AoD | | A, D |
| CoD | | C, D |
| (AoC)oE | | AoC, E, AoE, CoE |
| Ao(DoE) | | A, DoE, AoD, AoE |
| Co(DoE) | | C, DoE, CoD, CoE |
| (AoC)o(DoE) | | AoC, DoE, Ao(DoE), Co(DoE), (AoC)oD, (AoC)oE |
| (AoC)oD | | AoC, D, AoD, CoD |

Figure 13:
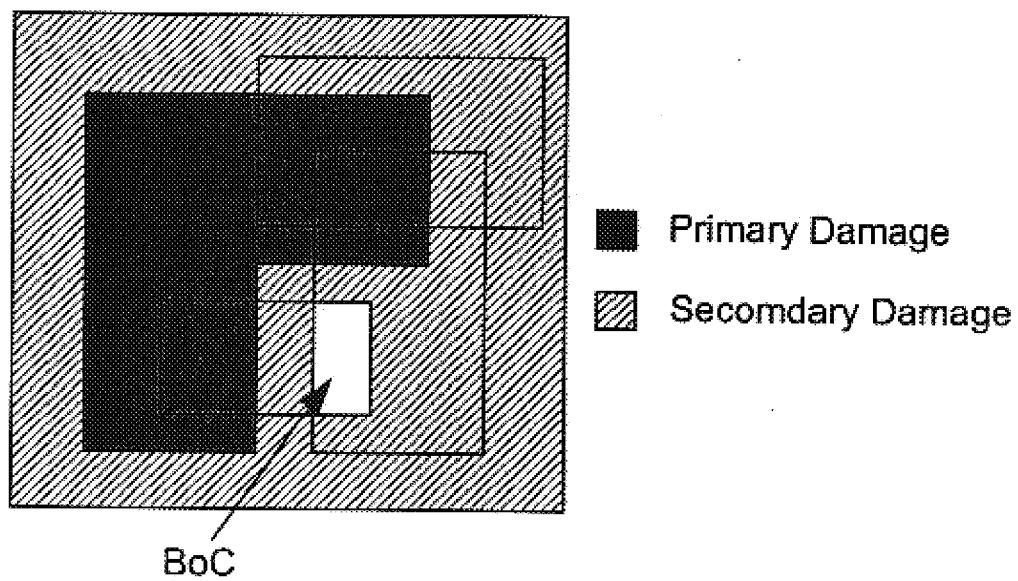
FIG. 13 illustrates the effect on the image of FIG. 12 of moving region A.
Figure 14:
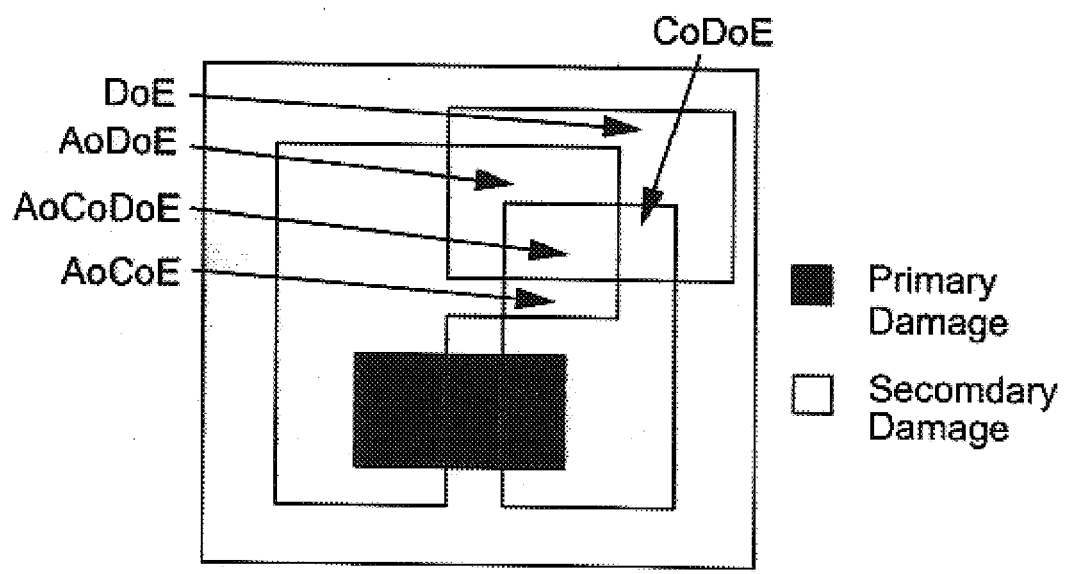
FIG. 14 illustrates the effect on the image of FIG. 12 of moving region B.

Since A intersects every other object, if A moves, a large amount of the compositing tree will need to be recomputed. FIG. 13 shows that the only part left alone is the area corresponding to BoC and its dependent BoCoE. To summarise:

Primary Damage—A, AoB, AoC, AoE, Ao(DoE), (AoB)oE, (AoC)oE, (AoC)o(DoE), AoD, (AoC)oD Secondary Damage—B, C, E, DoE, BoE, CoE, DoE, CoDoE On the other hand, if B moves, the amount of damage is less than if A moved. This is because B doesn't intersect D. DoE, Ao(DoE), (AoC)o(DoE), Co(DoE) and (AoC)oE (and their ancestors) are not damaged when B moves. This is shown in FIG. 14. The rest of the damage is summarised as:

Primary Damage—B, AoB, BoC, BoE, (AoB)oE, (BoC)oE

Secondary Damage—A, E, C, AoE, CoE

The examples presented so far are simple, but they are sufficient to demonstrate that the dependencies techniques presented so far will damage those contents labels which are affected when a particular contents label/s is(are) damaged. In a typical complex composite, it is rare for large numbers of objects to intersect a large number of other objects, meaning that large areas of the compositing tree should be untouched during updates using the above technique.

3.8 Example of Secondary Dependencies and Compositing Operators

Figure 18:
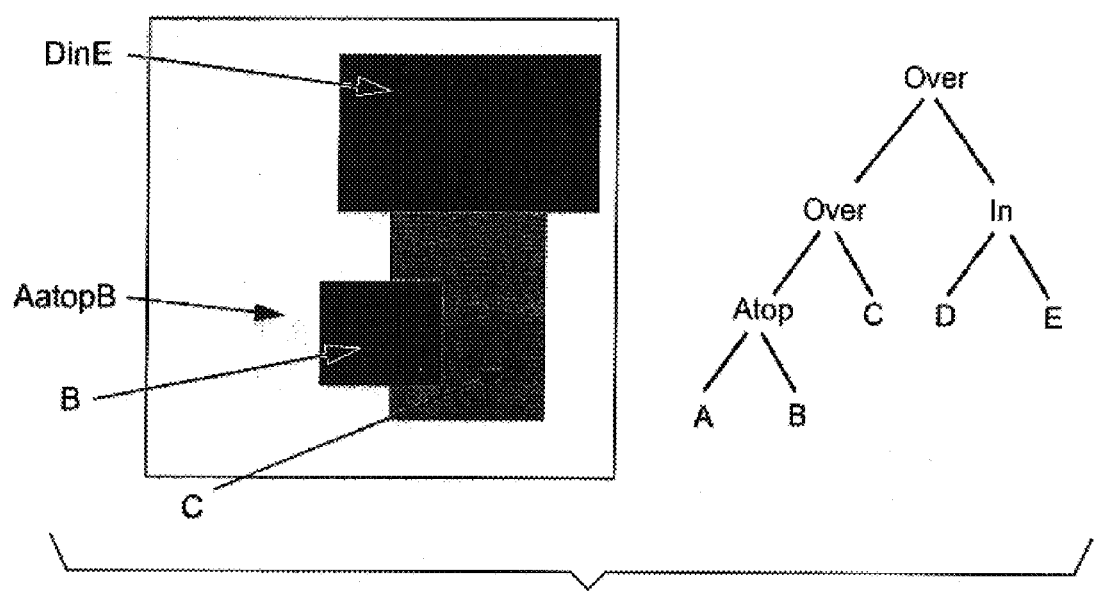
FIG. 18 illustrates an image and compositing tree according to still another example of the further embodiment.

Consider a modified version of Example 3 above. FIG. 18, will result in the following contents label table after the compositing tree is initially constructed. Note that AaB represents A ATOP B and AiB represents A IN B etc:

| Contents Label | Primary Deps | Secondary Deps |
|---|---|---|
| A | AaB | |
| B | AaB, BoC | |
| AaB | | B |
| C | BoC, Co(DiE) | |
| BoC | | B, C |
| D | DiE | |
| E | DiE | |
| DiE | Co(DiE) | |
| Co(DiE) | | C, DiE |

As seen in FIG. 18, the ATOP operator clips A to B's bounds, meaning that intersections between A and any of C, D or E never occur. Similar things occur with the IN operator. This means that the objects in this scene are less tightly coupled. For example, if A is changed, then only B and AaB are immediately damaged. Similarly, if E is damaged, it is only possible for DiE to be damaged.

3.9 Updating Region Groups

The further embodiment uses the contents label and damage framework to reduce the amount of work that has to be done to make a binary region group consistent with its updated operands during an update. The further embodiment does this by only updating those regions in a region group whose contents labels have primary or secondary damage, adding any new region which comes into existence as a result of the changes made to the compositing tree, and deleting any region in the right group whose contact no longer exists.

Each different binary operator has a different updating function which deals with the specific requirement of that operator. The process of updating region groups is a two-pass process. The first pass updates any intersection regions that have been primary damaged and adds any new intersection regions generated due to the damage. Each region of one operand's region group is intersected with each region of the other operand's region group whenever one or both of their corresponding contents labels are primary damaged. If the intersection is non-empty, then the further embodiment determines if a contents label representing the combination exists. If the contents label doesn't exist, one is created and primary damaged. Note that primary damaging a contents label will mark all it's secondary dependencies with secondary damage.

If a region in the region group is currently tagged with the primary damage contents label, the region boundary and proxy are updated. If no such region exists in this region group, then a new region keyed by this contents label is added to the region group. A new proxy is generated and assigned to this region along with the right description relating from the intersection operation.

A difference between each region group of one operand and the coverage region of the other operand is calculated whenever the regions contents label has primary or secondary damage. If the difference is non-empty and a region tagged with the contents label exists in the region group, then it's region description and proxy reference are updated. If such a region doesn't exist then a region keyed by the contents label is added to the region group. The added region is assigned as a coverage region of the difference result and references the proxy of current region.

Each region of one operand's region group is interacted with each region of the other operand's region group whenever the contents label representing their combination has secondary damage and no primary damage. If the intersection is non-empty, the region group is searched looking for a region keyed by the contents label. If such a region exists its region description is updated and it's proxy is updated as the difference between the new and old regions. If such a region doesn't exist, then a region keyed by the contents label is created. The created region description is assigned the result of the interaction operation and it's proxy generated.

Pseudocode which illustrates a simple algorithm for updating a binary "OVER" region group is provided below.

| | Notation |
|---|---|
| RG1 | The region group of the binary node's left child |
| RG2 | The region group of the binary node's right child |
| RG | The region group of the binary node. It is this region group that is being initialised. |
| RG1→urgn | The region description representing the union of all RG1's region descriptions (RG1's coverage region). |
| RG1→urgn | The region description representing the union of all RG2's region descriptions (RG2's coverage region). |
| RG→urgn | The union of all RG's region descriptions. |
| rg1i | The current region in RG1 |
| rg2j | The current region in RG2 |
| rg1i→rgn | rg1i's region description |
| rg2j→rgn | rg2j's region description |
| rg1i→proxy | rg1i's proxy |
| rg2j→proxy | rg2j's proxy |
| rg1i→clab | rg1i's contents label |
| rg2j→clab | rg2j's contents label |

```
RG→urgn = RG1→urgn union RG2→urgn
(First Pass-this pass is used to deal with primary damage of intersection regions
    and any new intersection regions generated)
FOR i = 0 TO number of regions in RG1 DO
    FOR j = 0 TO number of regions in RG2 DO
        IF rg1i→clab has PRIMARY damage OR rg2j→clab has
          PRIMARY
DAMAGE THEN
            inter_rgn = rg1i→rgn intersection rg2j→rgn
            IF inter_rgn is non-empty THEN
                comp_clab = SEARCH for an existing contents
                  label which
represents (rg1i→clab comp rg2j→clab).
                    IF a region tagged with comp_clab already exists in
                      RG
THEN
                        IF rg1i→clab is OPAQUE THEN
                            new_p = rg1i→proxy
                        ELSE
                            create new proxy new_p initialised to
                              OVER of
rg1i→proxy and rg2j→proxy inside inter_rgn.
                        END IF
                        MODIFY the existing region to have inter_rgn
                          as its
region description and new_p as its proxy.
                    ELSE
                        new_clab = create_binary_contents_label
                          (rg1i→clab,
```

-continued

Notation rg2$_j$→clab).
```
                IF rg1$_i$→clab is OPAQUE THEN
                    new_p = rg1$_i$→proxy
                ELSE
                    create new proxy new_p initialised to
                    OVER of
rg1$_i$→proxy and rg2$_j$→proxy inside inter_rgn.
                END IF
                damage_contents_label(new_clab)
                ADD to RG a new region with inter_rgn as its
                region
description, new_p as its proxy and new_clab as its contents label. (+)
            END IF
            FLAG the region as being 'RETAIN AFTER
            UPDATE'
        END IF
    END IF
END DO
END DO
```
(Second Pass-this pass is used to deal with primary and secondary damage of difference regions and secondary damage of intersection regions)
```
FOR i = 0 TO number of regions in RG1 DO
    IF rg1$_i$→clab has PRIMARY or SECONDARY damage THEN
        diff_rgn = rg1$_i$→rgn difference RG2→urgn
        IF diff_rgn is non-empty THEN
            IF a region tagged with rg1$_i$→clab already exists in RG
            THEN
                MODIFY it to have diff_rgn as its region
                description and
rg1$_i$→proxy as its proxy.
            ELSE
                ADD to RG a new region with diff_rgn as its
                region descrip-
tion. rg1$_i$→proxy as its proxy and rg1$_i$→clab as its contents label. (*)
            END IF
            FLAG the region as being 'RETAIN AFTER UPDATE'
        END IF
    END IF
    FOR j = 0 TO number of regions in RG2 DO
        comp_clab = SEARCH for an existing contents label which
        represents
(rg1$_i$→clab comp rg2$_j$→clab).
        IF comp_clab exists AND comp_clab has SECONDARY
        damage but
NO PRIMARY damage THEN
            inter_rgn = rg1$_i$→rgn intersection rg2$_j$→rgn
            IF inter_rgn is non-empty THEN
                GET a reference to the existing region tagged in this
                region
group with comp_clab which MUST exist in this region group
                IF rg1$_i$→clab is OPAQUE THEN
                    existing regions proxy =rg1$_i$→proxy
                ELSE
                    update_rgn = inter_rgn difference the region's
                    previous
region description.
                    update existing regions proxy to include OVER
                    of
rg1$_i$→proxy and rg2$_j$ → proxy inside update
region.
                END IF
                MODIFY the existing region to have inter_rgn as
                its region
description and new_p as its proxy.
                FLAG the region as being 'RETAIN AFTER
                UPDATE'
            END IF
        END IF
    END DO
END DO
FOR j= 0 TO number of regions in RG2 DO
    IF rg2$_j$→clab has PRIMARY or SECONDARY damage THEN
        diff_rgn = rg2$_j$→rgn difference RG1→urgn
        IF diff_rgn is non-empty THEN
```

-continued

Notation

```
            IF a region tagged with rg2$_j$→clab already exists in RG
            THEN
                MODIFY it to have diff_rgn as its region
                description and
rg2$_j$→proxy as its proxy.
            ELSE
                ADD to RG a new region with diff_rgn as its
                region
description,        rg2$_j$→proxy as its proxy and rg2$_j$→clab as its
                    contents
label. (*)
            END IF
            FLAG the region as being 'RETAIN AFTER UPDATE'
        END IF
    END IF
END DO
DELETE all regions of RG which are not marked RETAIN AFTER
UPDATE but whose contents labels have damage, and CLEAR flag in
retained regions.
```

4.0 Tree Modifications (Linking and Unlinking)

More complex changes to a compositing tree can be achieved by changing the tree's structure. Most typical tree structure changes can be made by using two low level operations, link and unlink.

The unlink operation is used to separate a child node from its parent. After the operation is completed, the child node has no parent (meaning the child node can be linked in somewhere else), and the parent has a link available (meaning that some other node can be linked there instead). Nodes in the compositing tree above the unlinked child contain content which is dependent on the unlinked child. Therefore, at the time of the next update, the contents label present in the unlinked child at the time of unlinking must be damaged to ensure that the dependent region groups higher in the tree are appropriately updated. The updating is achieved by the parent node caching away those contents labels existing in its unlinked child. If another subtree is linked in its place and subsequently unlinked without the region group of the parent being updated, it is not necessary to cache the contents labels of this new subtree. Pseudocode for the unlink operation is provided below. Note that the UNLINKED_LEFT or UNLINKED_RIGHT flag is set so that the contents labels of a newly linked subtree may be damaged when region groups (including their proxies) higher in the tree must then be updated. unlink

```
(
    node : compositing tree node
)
BEGIN
    parent = node→parent.
    node →parent = NULL.
    IF node is parent's left child THEN
        parent →left = NULL.
        IF parent doesn't have UNLINKED_LEFT set THEN
            SET the UNLINKED_LEFT flag in parent.
        ELSE.
            RETURN.
        END IF
    ELSE IF node is parent's right child THEN
        parent →right = NULL.
        IF parent doesn't have UNLINKED_RIGHT set THEN
            SET the UNLINKED_RIGHT flat in parent.
        ELSE
            RETURN
        END IF
```

-continued

```
    END IF
    COPY all the contents labels in node's region group into an array
        stored in
parent →unlinked_clabs.
END unlink
```

The link operation involves linking a node with no parent to a free link of a parent node.
Pseudocode for the operation is provided below.

```
link
(
    child : compositing tree node,
    parent : compositing tree node,
    which_link : either LEFT or RIGHT
)
BEGIN
    child →parent = parent
    IF which_link is LEFT THEN
        parent →left = child.
    ELSE
        parent → right = child.
    END IF
END LINK
```

4.1 Updating the Entire Compositing Tree

Figure 15:
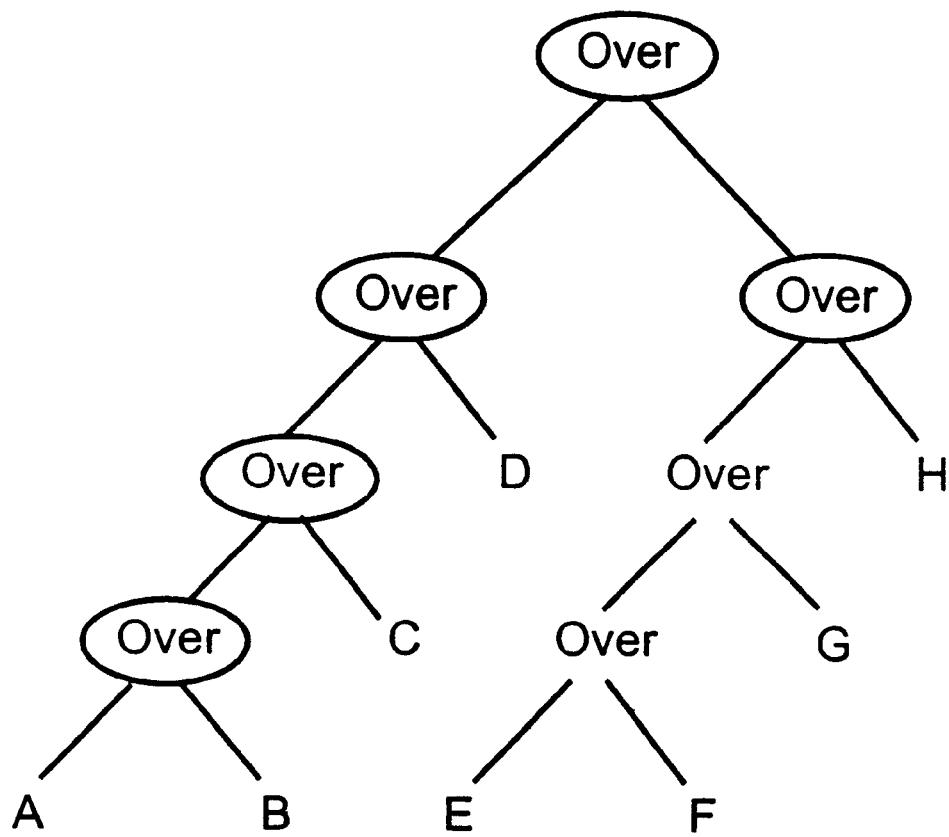
FIG. 15 illustrates those nodes in a compositing tree which need to have their region groups updated if leaf nodes B and H change.

If a leaf node in the compositing tree changes, the region group of every node in a direct line from the leaf node to the root of tree must be updated using the methods described above. FIG. 15 shows circled those nodes which need to have their region groups updated if leaf nodes B and H change in some way.

Pseudocode for the tree updating method is provided below:

```
update_tree
(
    node : compositing tree node
)
BEGIN
    IF node is leaf node THEN
        Rerender the leaf node and update its region group.
    ELSE
        IF unlinking occurred in left subtree or left subtree contains
           dirty leaf
nodes THEN
            update_tree(node →left).
        END IF.
        IF unlinking occurred in right subtree or right subtree contains
           dirty leaf
nodes THEN
            update_tree(node →right).
        END IF.
        IF node has UNLINKED_LEFT or UNLINKED_RIGHT
           flags set THEN
            CALL damage_contents_label on every element of
node→unlinked_clabs.
            IF node has UNLINKED_LEFT set THEN
                CALL damage_contents_label on every contents
                    label exist-
ing in node→left's region group.
                CLEAR the UNLINKED_LEFT flag in node.
            END IF
            IF node has UNLINKED_RIGHT set THEN
                CALL damage_contents_label on every contents
                    label exist-
ing in node→right's region group.
                CLEAR the UNLINKED_RIGHT flag in node.
            END IF
        END IF
        CALL the region group update routine appropriate for node's
            composit-
ing operator.
    END IF
END update_tree
```

The embodiments of the invention can be implemented using a conventional general-purpose computer system 2100, such as that shown in FIG. 19, wherein the process described with reference to FIG. 1 to FIG. 18 are implemented as software recorded on a computer readable medium that can be loaded into and carried out by the computer. The computer system 2100 includes a computer module 2101, input devices 2102, 2103 and a display device 2104.

Figure 19:
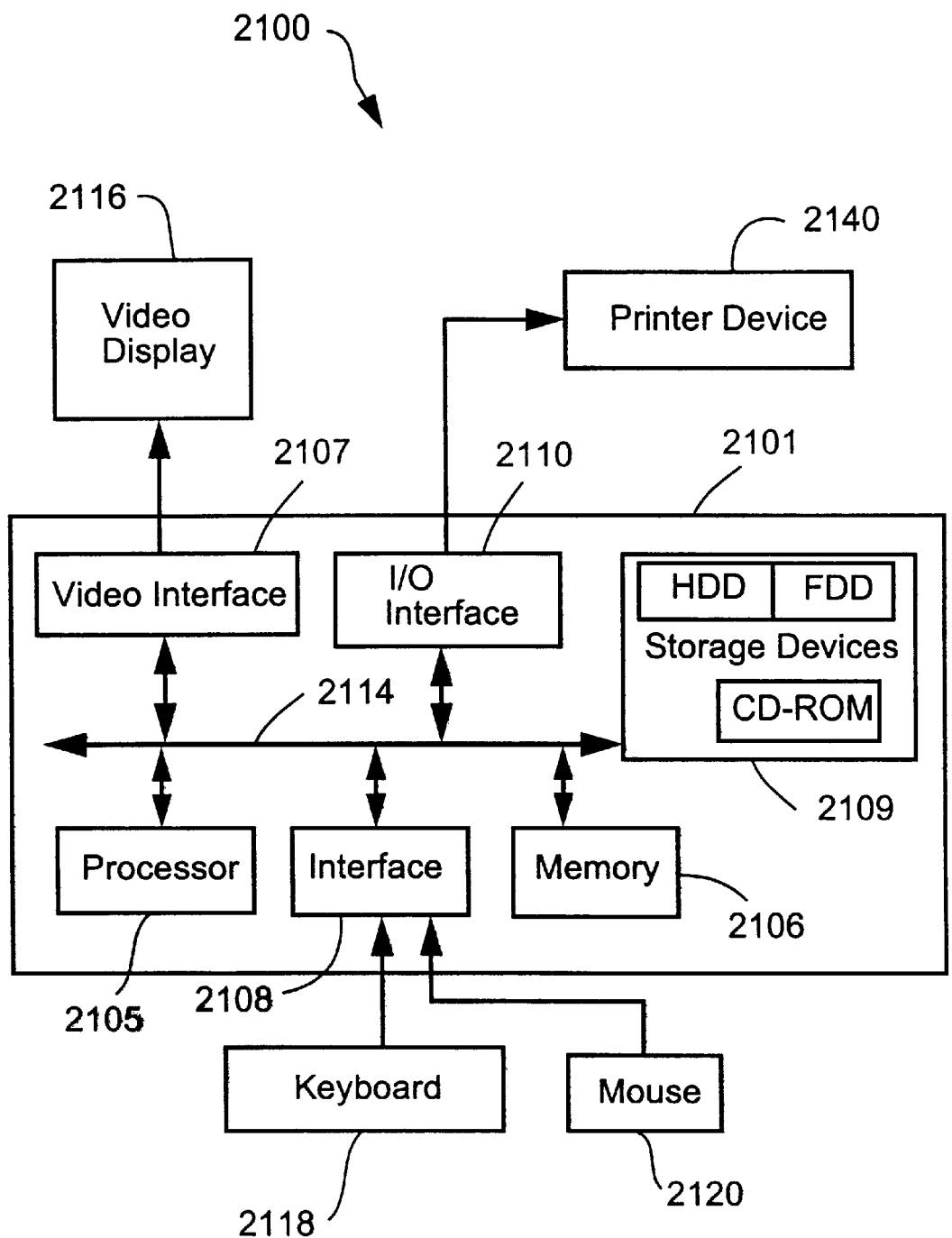
FIG. 19 illustrates an apparatus upon which the preferred embodiments is implemented.

With reference to FIG. 19, the computer module 2101 includes at least one processor unit 2105, a memory unit 2106 which typically includes random access memory (RAM) and read only memory (ROM), input/output (I/O) interfaces including a video interface 2107, keyboard 2118 and mouse 2120 interface 2108 and an I/O interface 2110. The storage device 2109 can include one or more of the following devices: a floppy disk, a hard disk drive, a CD-ROM drive or similar a non-volatile storage device known to those skilled in the art. The components 2105 to 2110 of the computer module 2101, typically communicate via an interconnected bus 2114 and in a manner which results in a usual mode of operation of the computer system 2100 known to those in the relevant art. Examples of computer systems on which the embodiments can be practised include IBM-PC/ATs and compatibles, Sun Sparcstations or alike computer system. In particular, the pseudocode described herein can be programmed into any appropriate language and stored for example on the HDD and executed in the RAM 2106 under control of the processor 2105 with the results being stored in RAM within the video interface 2107 and reproduced on the display 2116. The programs may be supplied to the system 2100 on a pre-programmed floppy disk or CD-ROM or accessed via a connection with a computer network, such as the Internet.

The aforementioned preferred method(s) comprise a particular control flow. There are many other variants of the preferred method(s) which use different control flows without departing the spirit or scope of the invention. Furthermore one or more of the steps of the preferred method(s) may be performed in parallel rather sequential.

The foregoing describes only several embodimens of the present invention, and modifications, obvious to those skilled in the art, can be made thereto without departing from the scope of the present invention.

In the context of this specification, the word "comprising" means "including principally but not necessarily solely" or "having" or "including" and not "consisting only of". Variations of the word comprising, such as "comprise" and "comprises" have corresponding meanings.

What is claimed is:

1. A method of creating an image, said image being formed by rendering a plurality of graphical objects according to a hierarchical structure representing a compositing expression, the hierarchical structure including a plurality of nodes each representing a sub-expression of the compositing expression, each said object having a predetermined outline, said method comprising the steps of:

dividing a space in which the outlines are defined into a plurality of mutually exclusive regions, each of the mutually exclusive regions being defined by a region outline substantially following at least one of the predetermined outlines or parts thereof, wherein each of the mutually exclusive regions has a corresponding one of the sub-expressions;

optimizing each of the sub-expressions corresponding to each of the mutually exclusive regions by:

examining said mutually exclusive region to determine those said objects which contribute to the mutually exclusive region; and modifying the sub-expression corresponding to that mutually exclusive region on the basis of the contribution of each of said objects within that mutually exclusive region, such that the hierarchical structure remains unchanged; and compositing the image according to the unchanged hierarchical structure using each of the optimized sub-expressions to create the image.

2. A method according to claim 1, further comprising the step of approximating each of the predetermined outlines on the outside and the inside to form an outline region.

3. A method according to claim 2, wherein each of the outline regions is approximated to a grid.

4. A method according to claim 1, wherein said examining comprises determining whether or not an opacity of each of the objects within the corresponding region has non-zero opacity.

5. A method according to claim 1, wherein the region outline is further defined by at least one attribute of at least one of the objects within the corresponding mutually exclusive region.

6. A method according to claim 5, wherein the attribute is selected from the group consisting of colour, opacity and object outline.

7. A method according to claim 1, wherein the image is at least in part a pixel-based image.

8. A method according to claim 1, wherein a flag is stored to indicate whether data of an object is opaque or ordinary.

9. A method according to claim 8, wherein a sub-expression is optimized based on a value of the flag for contributing objects.

10. A method according to claim 1, wherein a wholly opaque object in the mutually exclusive region acts to eliminate one or more objects within the mutually exclusive region from the sub-expressions.

11. A method according to claim 1, wherein a wholly transparent object in the mutually exclusive region eliminates at least itself from the sub-expression.

12. A method of creating an image, the image being formed by rendering at least a plurality of graphical objects according to a hierarchical structure representing a compositing expression, the hierarchical structure including a plurality of nodes each representing a sub-expression of the compositing expression, each of the objects having a predetermined outline, said method comprising the steps of:

dividing a space in which the outlines are defined into a plurality of mutually exclusive regions, wherein each of the mutually exclusive regions has a corresponding one of the sub-expressions;

examining each of the mutually exclusive regions to determine those said objects which contribute to each of the mutually exclusive regions;

modifying each of the sub-expressions corresponding to each of the mutually exclusive regions on the basis of the contribution of each of the objects within each of the mutually exclusive region, such that the hierarchical structure remains unchanged; and compositing the image according to the unchanged hierarchical structure using the modified sub-expressions.

13. A method according to claim 12, wherein each of the mutually exclusive regions is defined by a region outline substantially following at least one of the predetermined outlines or parts thereof.

14. A method according to claim 13, wherein the region outline is further defined by at least one attribute of at least one the object within the corresponding mutually exclusive region.

15. A method according to claim 14, wherein the attribute is selected from the group consisting of colour, opacity and object outline.

16. A method according to claim 12, further comprising the step of approximating each the predetermined outline on the outside and the inside to form an outline region.

17. A method according to claim 16, wherein each the outline region is approximated to a grid.

18. A method according to claim 14, wherein modifying the sub-expressions forms an optimized compositing expression.

19. A method according to claim 14, wherein said examining comprises determining whether or not an opacity of each of the objects within the corresponding mutually exclusive region has non-zero opacity.

20. A method according to claim 12, wherein the image is at least in part a pixel-based image.

21. A method according to claim 12, wherein a flag is stored to indicate whether data of an object is opaque or ordinary.

22. A method according to claim 21, wherein the sub-expression is optimized based on a value of the flag for contributing objects.

23. A method according to claim 12, wherein a wholly opaque object in the region acts to eliminate one or more objects within the mutually exclusive region from the corresponding sub-expression.

24. A method according to claim 12, wherein a wholly transparent object eliminates at least itself from corresponding sub-expression.

25. A method of creating an image, the image comprising a plurality of graphical objects to be composited according to a hierarchical structure representing a compositing expression, the hierarchical structure including a plurality of nodes each representing a sub-expression of the compositing expression, said method comprising the steps of:

dividing a space in which the graphical objects are defined into a plurality of mutually exclusive regions, wherein each of the mutually exclusive regions has a corresponding one of the sub-expressions;

examining each of the mutually exclusive regions to determine those said objects which contribute to each of the mutually exclusive regions;

modifying each of the sub-expressions on the basis of said examination, such that the hierarchical structure remains unchanged; and compositing the image according to the unchanged hierarchical structure using the modified sub-expressions.

26. A method according to claim 25, wherein each the object has a predetermined outline.

27. A method according to claim 26, further comprising the step of approximating each the predetermined outline on the outside and the inside to form an outline region.

28. A method according to claim 27, wherein each the outline region is approximated to a grid.

29. A method according to claim 25, wherein a sub-expression is modified on the basis of the contribution of each of the objects within the corresponding mutually exclusive region.

30. A method according to claim 25, wherein each of the mutually exclusive regions is defined by a region outline substantially formed of at least one of the predetermined outlines or parts thereof.

31. A method according to claim 30, wherein the region outline is further defined by at least one attribute of at least one of the objects within the corresponding mutually exclusive region.

32. A method according to claim 31, wherein the attribute is selected from the group consisting of colour, opacity and object outline.

33. A method according to claim 25, wherein modifying said sub-expressions forms an optimized compositing expression.

34. A method according to claim 25, wherein said examining comprises determining whether or not an opacity of each of the objects within the corresponding mutually exclusive region has non-zero opacity.

35. A method according to claim 25, wherein the image is at least in part a pixel-based image component.

36. A method according to claim 25, wherein a flag is stored to indicate whether data of an object is opaque or ordinary.

37. A method according to claim 36, wherein a sub-expression is optimized based on a value of the flag for contributing objects.

38. A method according to claim 25, wherein a wholly opaque object in a mutually exclusive region acts to eliminate one or more objects within the mutually exclusive region from the corresponding sub-expression.

39. A method according to claim 25, wherein a wholly transparent object in a mutually exclusive region eliminates at least itself from the corresponding sub-expression.

40. An apparatus for creating an image, the image being formed by rendering a plurality of graphical objects according to a hierarchical structure representing a compositing expression, the hierarchical structure including a plurality of nodes each representing a sub-expression of the compositing expression, each of the objects having a predetermined outline, said apparatus comprising:

dividing means for dividing a space in which the outlines are defined into a plurality of mutually exclusive regions, each of the mutually exclusive regions being defined by a region outline substantially following at least one of the predetermined outlines or parts thereof, wherein each of the mutually exclusive regions has a corresponding one of the sub-expressions;

optimizing means for optimizing each of the sub-expressions corresponding to each of the mutually exclusive regions, said optimizing means comprising:
examining means for examining each of the mutually exclusive regions to determine those of the objects which contribute to that mutually exclusive region; and
modifying means for modifying the sub-expression corresponding to that mutually exclusive region on the basis of the contribution of each of the objects within that mutually exclusive region, such that the hierarchical structure remains unchanged; and
compositing means for compositing the image according to the unchanged hierarchical structure using each of the optimized sub-expressions to create an image.

41. An apparatus according to claim 40, further comprising approximating means for approximating each of the predetermined outlines on the outside and the inside to form an outline region.

42. An apparatus according to claims 41, wherein each of the outline regions is approximated to a grid.

43. An apparatus according to claim 40, wherein said examining comprises determining whether or not an opacity of each of the objects within the corresponding mutually exclusive region has non-zero opacity.

44. An apparatus according to claim 40, wherein the region outline is further defined by at least one attribute of at least one of the objects within the corresponding region.

45. An apparatus according to claim 44, wherein the attribute is selected from the group consisting of colour, opacity and object outline.

46. An apparatus according to claim 40, wherein the image is at least in part a pixel-based image.

47. An apparatus according to claim 40, wherein a flag is stored to indicate whether data of an object is opaque or ordinary.

48. An apparatus according to claim 47, wherein a sub-expression is optimized based on a value of the flag for contributing objects.

49. An apparatus according to claim 40, wherein a wholly opaque object in the mutually exclusive region acts to eliminate one or more objects within the mutually exclusive region from the corresponding sub-expressions.

50. An apparatus according to claim 40, wherein a wholly transparent object in the mutually exclusive region eliminates at least itself from the corresponding sub-expression.

51. An apparatus for creating an image, the image being formed by rendering at least a plurality of graphical objects according to a hierarchical structure representing a compositing expression, the hierarchical structure including a plurality of nodes each representing a sub-expression of the compositing expression, each of the objects having a predetermined outline, said apparatus comprising:

dividing means for dividing a space in which the outlines are defined into a plurality of mutually exclusive regions, wherein each of the mutually exclusive regions has a corresponding one of the sub-expressions;

examining means for examining each of the mutually exclusive regions to determine those said objects which contribute to each of the mutually exclusive regions;

modifying means for modifying each of the sub-expressions corresponding to the mutually exclusive regions on the basis of the contribution of each of the objects within each of the mutually exclusive regions, such that the hierarchical structure remains unchanged; and compositing means for compositing the image according to the unchanged hierarchical structure using the modified sub-expressions.

52. An apparatus according to claim 51, wherein each of the mutually exclusive regions is defined by a region outline substantially following at least one of said predetermined outlines or parts thereof.

53. An apparatus according to claim 52, wherein the region outline is further defined by at least one attribute of at least one the object within the corresponding mutually exclusive region.

54. An apparatus according to claim 53, wherein the attribute is selected from the group consisting of colour, opacity and object outline.

55. An apparatus according to claim 51, further comprising approximating means for approximating each of the predetermined outlines on the outside and the inside to form an outline region.

56. An apparatus according to claim 55, wherein each of the outline regions is approximated to a grid.

57. An apparatus according to claim 51, wherein modifying the sub-expressions forms an optimized compositing expression.

58. An apparatus according to claim 51, wherein said examining comprises determining whether or not an opacity of each of the objects within the corresponding mutually exclusive region has non-zero opacity.

59. An apparatus according to claim 51, wherein the image is at least in part a pixel-based image.

60. An apparatus according to claim 51, wherein a flag is stored to indicate whether data of an object is opaque or ordinary.

61. An apparatus according to claim 60, wherein a sub-expression is optimized based on a value of the flag for contributing objects.

62. An apparatus according to claim 51, wherein a wholly opaque object in the mutually exclusive region acts to eliminate one or more objects within the mutually exclusive region from the corresponding sub-expression.

63. An apparatus according to claim 51, wherein a wholly transparent object eliminates at least itself from the corresponding sub-expression.

64. An apparatus for creating an image, the image comprising a plurality of graphical objects to be composited according to a hierarchical structure representing a compositing expression, the hierarchical structure including a plurality of nodes each representing a sub-expression of the compositing expression, said apparatus comprising:
dividing means for dividing a space in which the graphical objects are defined into a plurality of mutually exclusive regions, wherein each of the mutually exclusive regions has a corresponding one of the sub-expressions;
examining means for examining each of the mutually exclusive regions to determine those said objects which contribute to each of the mutually exclusive regions;
modifying means for modifying each of the sub-expressions on the basis of the examination, such that the hierarchical structure remains unchanged; and
compositing means for compositing the image according to the unchanged hierarchical structure using the modified sub-expressions.

65. An apparatus according to claim 64, wherein each the object has a predetermined outline.

66. An apparatus according to claim 65, further comprising approximating means for approximating each of the predetermined outlines on the outside and the inside to form an outline region.

67. An apparatus according to claim 66, wherein each the outline region is approximated to a grid.

68. An apparatus according to claim 64, wherein a sub-expression is modified on the basis of the contribution of each of the objects within the corresponding mutually exclusive region.

69. An apparatus according to claim 64, wherein each of the mutually exclusive regions is defined by a region outline substantially formed of at least one of the predetermined outlines or parts thereof.

70. An apparatus according to claim 69, wherein the region outline is further defined by at least one attribute of at least one of the objects within the corresponding region.

71. An apparatus according to claim 70, wherein the attribute is selected from the group consisting of colour, opacity and object outline.

72. An apparatus according to claim 64, wherein modifying the sub-expressions forms an optimized compositing expression.

73. An apparatus according to claim 64, wherein said examining comprises determining whether or not an opacity of each of the objects within the corresponding mutually exclusive region has non-zero opacity.

74. An apparatus according to claim 64, wherein the image is at least in part a pixel-based image component.

75. An apparatus according to claim 64, wherein a flag is stored to indicate whether data of an object is opaque or ordinary.

76. An apparatus according to claim 75, wherein a sub-expression is optimized based on a value of the flag for contributing objects.

77. An apparatus according to claim 64, wherein a wholly opaque object in a mutually exclusive region acts to eliminate one or more objects within the mutually exclusive region from the corresponding sub-expression.

78. An apparatus according to claim 64, wherein a wholly transparent object in a mutually exclusive region eliminates at least itself from the corresponding sub-expression.

79. A computer program product including a computer readable medium having a plurality of software modules for creating an image, the image being formed by rendering a plurality of graphical objects according to a hierarchical structure representing a compositing expression, the hierarchical structure including a plurality of nodes each representing a sub-expression of the compositing expression, each of the objects having a predetermined outline, said computer program product comprising:
a dividing module for dividing a space in which the outlines are defined into a plurality of mutually exclusive regions, each of the mutually exclusive regions being defined by a region outline substantially following at least one of the predetermined outlines or parts thereof, wherein each said mutually exclusive region has a corresponding one of the sub-expressions;
an optimizing module for optimizing each of the sub-expressions corresponding to each of the mutually exclusive regions, said optimizing module further comprising:
an examining module for examining the mutually exclusive region to determine those of the objects which contribute to the mutually exclusive region; and
a modifying module for modifying the sub-expression corresponding to said mutually exclusive region on the basis of the contribution of each of said objects within said mutually exclusive region, such that the hierarchical structure remains unchanged; and
a compositing module for compositing the image according to the unchanged hierarchical structure using each of the optimized sub-expressions to create the image.

80. A computer program product including a computer readable medium having a plurality of software modules for creating an image, the image being formed by rendering at least a plurality of graphical objects according to a hierarchical structure representing a compositing expression, each of the objects having a predetermined outline, the hierarchical structure including a plurality of nodes each representing a sub-expression of the compositing expression, said computer program product comprising:
a dividing module for dividing a space in which the outlines are defined into a plurality of mutually exclusive regions, wherein each of the mutually exclusive regions has a corresponding one of the sub-expressions;
an examining module for examining each of the mutually exclusive regions to determine those of the objects which contribute to each of the mutually exclusive regions;
a modifying module for modifying each of the sub-expressions corresponding to each of the mutually exclusive regions on the basis of the contribution of each of the objects within each of the mutually exclusive regions, such that the hierarchical structure remains unchanged; and a compositing module for compositing the image according to the unchanged hierarchical structure using the modified sub-expressions.

81. A computer program product including a computer readable medium having a plurality of software modules for creating an image, the image comprising a plurality of graphical objects to be composited according to a hierarchical structure representing a compositing expression, the hierarchical structure including a plurality of nodes each representing a sub-expression of the compositing expression, said computer program product comprising:

a dividing module for dividing a space in which the graphical objects are defined into a plurality of mutually exclusive regions, wherein each of the mutually exclusive regions has a corresponding one of said sub-expressions;

an examining module for examining each of the mutually exclusive regions to determine those of the objects which contribute to each of the mutually exclusive regions;

a modifying module for modifying each of the sub-expressions on the basis of said examination, such that the hierarchical structure remains unchanged; and a compositing module for compositing the image according to the unchanged hierarchical structure using the modified sub-expressions.

82. A method of processing image data for creating an image by rendering graphical objects according to a hierarchical structure representing a compositing expression, the hierarchical structure including a plurality of nodes each representing a sub-expression of the compositing expression, comprising the steps of:

dividing a space in which the objects are defined into a plurality of mutually exclusive regions in accordance with outlines of the objects, wherein each of the mutually exclusive regions has a corresponding one of the sub-expressions;

examining a part of the space by utilizing each of the mutually exclusive regions; and modifying each of the sub-expressions based on a result of said examining step, such that the hierarchical structure remains unchanged.

83. A method according to claim 82, wherein said examining step comprises a step of determining the existence of each of the objects.

84. A method according to claim 83, wherein said examining step comprises a step of determining an opacity of each of the objects.

85. A method according to claim 82, wherein said examining step comprises a step of determining a change of the part between images of a plurality of images.

* * * * *

UNITED STATES PATENT AND TRADEMARK OFFICE
CERTIFICATE OF CORRECTION

PATENT NO.      : 6,795,589 B1
DATED           : September 21, 2004
INVENTOR(S)     : Martin Paul Tlaskal et al.

It is certified that error appears in the above-identified patent and that said Letters Patent is hereby corrected as shown below:

Column 1,
Line 40, "outer most" should read -- outermost --.

Column 10,
Line 2, "is" should read -- are --; and
Line 16, "invention" should read -- invention. --.

Column 14,
Line 64, "advantageious" should read -- advantageous --.

Column 16,
Line 1, "contains" should read -- contain --.

Column 20,
Line 13, "stores" should read -- store --.

Column 31,
Line 59, "it's" should read -- its --.

Column 34,
Line 47, "unlink" should read -- ¶ unlink --.

Column 36,
Line 1, "process" should read -- processes --.
Line 38, "rather" should read -- rather than --.

Column 37,
Line 34, "the sub-expressions." should read -- the corresponding sub-expression. --.
Line 56, "region," should read -- regions, --.
Line 66, "the" (first occurrence) should be deleted.

Column 38,
Line 5, "the" (second occurrence) should be deleted;
Line 7, "the" should be deleted;
Line 21, "optimized" should read -- modified --;
Line 28, "from" should read -- from the --;
Line 49, "the" should be deleted;
Line 52, "the" (second occurrence) should be deleted;
Line 54, "the" should be deleted; and
Line 60, "claim 25," should read -- claim 26, --.

UNITED STATES PATENT AND TRADEMARK OFFICE
CERTIFICATE OF CORRECTION

PATENT NO. : 6,795,589 B1
DATED : September 21, 2004
INVENTOR(S) : Martin Paul Tlaskal et al.

It is certified that error appears in the above-identified patent and that said Letters Patent is hereby corrected as shown below:

Column 39,
Line 16, "optimized" should read -- modified --; and
Line 59, "claims 41," should read -- claim 41,--

Column 40,
Line 14, "sub-expressions." should read -- sub-expression. --; and
Line 48, "the" (first occurrence) should be deleted.

Column 41,
Line 5, "optimized" should read -- modified --;
Line 34, "the" should be deleted;
Line 40, "the" should be deleted; and
Line 46, "claim 64," should read -- claim 65, --.

Signed and Sealed this

Fifth Day of July, 2005

JON W. DUDAS
*Director of the United States Patent and Trademark Office*